United States Patent
Lin et al.

(10) Patent No.: US 10,742,114 B2
(45) Date of Patent: *Aug. 11, 2020

(54) SYSTEMS AND METHODS FOR REDUCING ELECTROMAGNETIC INTERFERENCE USING SWITCHING FREQUENCY JITTERING

(71) Applicant: ON-BRIGHT ELECTRONICS (SHANGHAI) CO., LTD., Shanghai (CN)

(72) Inventors: Yuan Lin, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,117

(22) Filed: Mar. 28, 2016

(65) Prior Publication Data

US 2016/0285361 A1 Sep. 29, 2016

Related U.S. Application Data

(63) Continuation of application No. 13/323,458, filed on Dec. 12, 2011, now Pat. No. 9,331,567.

(30) Foreign Application Priority Data

Oct. 25, 2011 (CN) .......................... 2011 1 0342023

(51) Int. Cl.
  *H02M 1/44* (2007.01)
  *H02M 3/335* (2006.01)
  *H02M 1/00* (2006.01)

(52) U.S. Cl.
  CPC ......... *H02M 1/44* (2013.01); *H02M 3/33507* (2013.01); *H02M 2001/0058* (2013.01); *Y02B 70/1433* (2013.01); *Y02B 70/1491* (2013.01)

(58) Field of Classification Search
  CPC .... H02M 3/335; H02M 3/33507; H02M 1/44; H02M 2001/0058; H04B 15/005; H03K 7/06; Y02B 70/1433; Y02B 70/1491
  See application file for complete search history.

(56) References Cited

U.S. PATENT DOCUMENTS 8,098,502 B2  1/2012 Mao et al.
8,526,203 B2  9/2013 Huang et al.
(Continued)

FOREIGN PATENT DOCUMENTS

CN   201210648 Y   3/2009
CN   101552570 A   10/2009
(Continued)

OTHER PUBLICATIONS

Chinese Patent Office, Office Action dated Sep. 17, 2014, in Application No. 201110342023.7.
(Continued)

*Primary Examiner* — Gary L Laxton
*Assistant Examiner* — Ivan Laboy
(74) *Attorney, Agent, or Firm* — Faegre Drinker Biddle & Reath LLP

(57) ABSTRACT

System and method are provided for regulating a power converter. The system includes a signal processing component configured to receive a first input signal and a second input signal, process information associated with the first input signal and the second input signal, and output a drive signal to a switch based on at least information associated with the first input signal and the second input signal. The first input signal is associated with at least a feedback signal related to an output voltage of the power converter. The second input signal is associated with at least a primary current flowing through a primary winding of the power converter. The signal processing component is further con- (Continued)

figured to change a peak value of the primary current within a first predetermined range, and change the switching frequency of the power converter within a second predetermined range.

4 Claims, 15 Drawing Sheets

(56) References Cited

U.S. PATENT DOCUMENTS

| | | | |
|---|---|---|---|
| 9,331,567 B2* | 5/2016 | Lin | H02M 3/33507 |
| 2002/0136034 A1 | 9/2002 | Feldtkeller | |
| 2003/0174005 A1 | 9/2003 | Latham et al. | |
| 2006/0232306 A1 | 10/2006 | Swanson et al. | |
| 2007/0115696 A1 | 5/2007 | Berghegger | |
| 2007/0133234 A1 | 6/2007 | Huynh et al. | |
| 2008/0073974 A1* | 3/2008 | Madigan | H02M 3/33561 307/31 |
| 2008/0100277 A1 | 5/2008 | Yang | |
| 2008/0192515 A1* | 8/2008 | Huynh | H02M 3/33507 363/21.12 |
| 2008/0198638 A1 | 8/2008 | Reinberger et al. | |
| 2008/0259654 A1* | 10/2008 | Huynh | H02M 3/33523 363/21.16 |
| 2008/0259656 A1* | 10/2008 | Grant | H02M 3/33523 363/21.18 |
| 2009/0115391 A1 | 5/2009 | Chuang et al. | |
| 2009/0147547 A1 | 6/2009 | Yamashita | |
| 2009/0237058 A1 | 9/2009 | Mulligan et al. | |
| 2010/0117699 A1 | 5/2010 | Wu et al. | |
| 2010/0275052 A1 | 10/2010 | Ku | |
| 2011/0085356 A1 | 4/2011 | Morota | |
| 2011/0085359 A1 | 4/2011 | Gong et al. | |
| 2011/0110126 A1 | 5/2011 | Morrish | |
| 2011/0149614 A1 | 6/2011 | Stracquadaini | |
| 2013/0033905 A1 | 2/2013 | Lin et al. | |
| 2013/0051089 A1 | 2/2013 | Pan et al. | |
| 2013/0077359 A1 | 3/2013 | Lindemann et al. | |
| 2013/0083565 A1* | 4/2013 | Gaknoki | H02M 1/08 363/21.17 |
| 2013/0300464 A1 | 11/2013 | Kleinpenning et al. | |
| 2014/0085936 A1 | 3/2014 | Jin et al. | |
| 2015/0326116 A1 | 11/2015 | Zhang et al. | |
| 2016/0134186 A1 | 5/2016 | Saint-Pierre et al. | |
| 2020/0044563 A1 | 2/2020 | Lin et al. | |

FOREIGN PATENT DOCUMENTS

| | | |
|---|---|---|
| CN | 101635511 A | 1/2010 |
| CN | 101645655 A | 2/2010 |
| TW | 201308850 A | 2/2013 |
| WO | WO 2010/003785 A2 | 1/2010 |
| WO | WO 2010/110727 A1 | 9/2010 |

OTHER PUBLICATIONS

Taiwanese Patent Office, Office Action dated May 14, 2014, in Application No. 100146610.
United States Patent and Trademark Office, Office Action dated Oct. 3, 2014, in U.S. Appl. No. 13/323,458.
United States Patent and Trademark Office, Office Action dated Jun. 16, 2015, in U.S. Appl. No. 13/323,458.
United States Patent and Trademark Office, Notice of Allowance dated Jan. 14, 2016, in U.S. Appl. No. 13/323,458.
United States Patent and Trademark Office, Office Action dated Oct. 25, 2018, in U.S. Appl. No. 15/719,212.
United States Patent and Trademark Office, Notice of Allowance dated Apr. 3, 2019, in U.S. Appl. No. 15/719,212.
United States Patent and Trademark Office, Office Action dated Feb. 21, 2020, in U.S. Appl. No. 16/456,909.
United States Patent and Trademark Office, Office Action dated Apr. 16, 2020, in U.S. Appl. No. 16/797,427.

* cited by examiner

US 10,742,114 B2

SYSTEMS AND METHODS FOR REDUCING ELECTROMAGNETIC INTERFERENCE USING SWITCHING FREQUENCY JITTERING

1. CROSS-REFERENCES TO RELATED APPLICATIONS

This application is a continuation of U.S. patent application Ser. No. 13/323,458, filed Dec. 12, 2011, which claims priority to Chinese Patent Application No. 201110342023.7, filed Oct. 25, 2011, commonly assigned, both of the above-referenced applications being incorporated by reference herein for all purposes.

2. BACKGROUND OF THE INVENTION

The present invention is directed to integrated circuits. More particularly, the invention provides systems and methods for reducing electromagnetic interference (EMI) using switching frequency jittering in the quasi-resonant mode. Merely by way of example, the invention has been applied to a power conversion system. But it would be recognized that the invention has a much broader range of applicability.

Switching-mode power conversion systems often have switching frequencies in the range of tens of kHz and hundreds of kHz. Parasitic capacitance and parasitic inductance usually exist in the switching-mode power conversion systems. Electromagnetic interference (EMI) generated by a switching-mode power conversion system often needs to be reduced in order to avoid interfering significantly with other power components. To reduce the size of a switching-mode power conversion system, the switching frequency of the switching-mode power conversion system usually needs to be increased. But increasing the switching frequency often exacerbates the problems related to EMI and switching loss.

A fixed-frequency controller with frequency jittering is often used in a power conversion system to reduce the EMI. FIG. 1 is a simplified diagram showing a conventional power conversion system including a fixed-frequency pulse-width-modulation (PWM) controller. The power conversion system 100 includes a fixed-frequency PWM controller 102, a primary winding 118, a secondary winding 120, a power switch 122, a current sensing resistor 124, a feedback-and-isolation component 126, a rectifying diode 128 and a capacitor 130. The fixed-frequency PWM controller 102 includes an oscillator 104, a PWM comparator 106, a flip-flop 108, a gate driver 110, a diode 112, and two resistors 114 and 116. The fixed-frequency PWM controller 102 further includes three terminals 132, 134 and 136. For example, the power switch 122 is a field-effect transistor (FET), a bipolar junction transistor (BJT), or an insulated-gate bipolar transistor (IGBT).

The switching frequency of the power conversion system 100 is often determined by the oscillator 104. To reduce the EMI, the oscillator 104 is often used to perform switching frequency jittering in different ways, e.g., ramping up and down the switching frequency of the power conversion system 100, or using a pseudo-random generator to change the switching frequency.

FIG. 2 is a simplified conventional timing diagram for the power conversion system 100 showing frequency jittering by ramping up and down the switching frequency by the oscillator 104. The waveform 202 represents the switching frequency of the power conversion system 100 as a function of time. The waveform 204 represents turned-on and turned-off conditions of the switch 122 as a function of time. For example, if the waveform 204 is at a logic high level, the switch 122 is closed (e.g., on), and if the waveform 204 is at a logic low level, the switch 122 is open (e.g., off). Two time periods $T_1$ and $T_2$ are shown in FIG. 2. The time period $T_1$ starts at time $t_0$ and ends at time $t_1$, and the time period $T_2$ starts at time $t_1$ and ends at time $t_2$. For example, $t_0 \le t_1 \le t_2$.

During the time period $T_1$, the switching frequency of the power conversion system 100 ramps up from a minimum frequency 206 (at $t_0$) to a maximum frequency 208 (at $t_1$) as shown by the waveform 202. The frequency of the switch 122 being turned on and off increases as shown by the waveform 204. During the time period $T_2$, the switching frequency of the power conversion system 100 ramps down from the maximum frequency 208 (at $t_1$) to the minimum frequency 206 (at $t_2$) as shown by the waveform 202. The frequency of the switch 122 being turned on and off decreases as shown by the waveform 204.

The magnitude of the frequency jittering is usually controlled within a certain range to avoid audio noise caused by excessive frequency jittering. For example, if the fixed-frequency system 100 has a switching frequency of about 60 kHz, the range of frequency jittering can be ±4%. That is, the switching frequency range of the system 100 is 60 kHz±2.4 kHz. The frequency range for energy distribution of an nth-order harmonic is ±2.4 nkHz. The total harmonics energy of the fixed frequency system 100 remains the same, while the harmonic energy amplitude at each harmonic frequency reduces. Thus, the conduction EMI of the system 100 is often improved.

In operation, the system 100 usually has a parasitic inductance $L_k$ in the transformer including the primary winding 118 and the secondary winding 120. The power switch 122 often has a parasitic capacitance $C_p$ between the terminals 138 and 140. The parasitic inductance $L_k$ and the parasitic capacitance $C_p$ often not only reduce the system efficiency, but increase the EMI. For example, when the power switch 122 is open (e.g., off), the parasitic inductance $L_k$ and the parasitic capacitance $C_p$ often cause resonation, and a high peak voltage is generated at the terminal 138. Then after the primary inductance $L_p$ of the transformer is demagnetized, the primary inductance $L_p$ and the parasitic capacitance $C_p$ often cause resonation, and the voltage of the terminal 138 oscillates with decreasing amplitude. But the amplitude of the voltage of the terminal 138 is often at a high level. When the power switch 122 is closed (e.g., on) during a next period, the parasitic capacitance $C_p$ often discharges through the power switch 122, and generates a high peak current including many harmonics, which usually exacerbates the problems related to switching loss and EMI.

Quasi-resonant (QR) techniques can be implemented to take advantage of the parasitic inductance and the parasitic capacitance existing in a power conversion system to improve system efficiency. FIG. 3 is a simplified diagram showing a conventional fly-back power conversion system including a QR controller. The power conversion system 300 includes a QR controller 302, a primary winding 304, a secondary winding 306, a power switch 308, a rectifying diode 310, a capacitor 312, an output load 316, and an auxiliary winding 330. For example, the power switch 308 is a field-effect transistor (FET), a bipolar junction transistor (BJT) or an insulated-gate bipolar transistor (IGBT).

As shown in FIG. 3, the fly-back conversion system 300 has a parasitic inductance 318 (e.g., $L_k$) in the transformer including the primary winding 304 and the secondary winding 306, and a primary inductance 334 (e.g., $L_p$) of the transformer. The power switch 308 has a parasitic capacitance 314 (e.g., $C_p$) between the terminals 320 and 322.

In operation, if the power switch 308 is closed (e.g., on), a current 324 (e.g., $I_p$) flows through the power switch 308. For example, the voltage between the terminals 320 and 324 of the power switch 308 is determined based on the following equation:

$$V_{ds} = V_{in} + N \times V_{out} \qquad \text{(Equation 1)}$$

wherein $V_{ds}$ represents the voltage between the terminals 320 and 324 of the power switch 308, $V_{in}$ represents an input voltage 326 on the primary side of the system 300, and $V_{out}$ represents an output voltage 328 on the secondary side of the system 300. Additionally, N represents a turns ratio between the primary winding 304 and the secondary winding 306.

FIG. 4 is a simplified conventional timing diagram for the power conversion system 300. The waveform 402 represents the voltage between the terminals 320 and 322 of the power switch 308 (e.g., $V_{ds}$) as a function of time. The waveform 404 represents turned-on and turned-off conditions of the switch 308 as a function of time. The waveform 406 represents the current 324 that flows through the power switch 308 as a function of time. For example, if the waveform 404 is at a logic high level, the switch 308 is closed (e.g., on), and if the waveform 404 is at a logic low level, the switch 308 is open (e.g., off).

Five time periods $T_{on}$, $T_r$, $T_{demag}$, $T_{off}$, and $T_s$ are shown in FIG. 4. The time period $T_{on}$ starts at time $t_0$ and ends at time $t_1$, and the time period $T_{demag}$ starts at time $t_1$ and ends at time $t_2$. The time period $T_r$ starts at the time $t_2$ and ends at time $t_3$, and the time period $T_{off}$ starts at the time $t_1$ and ends at the time $t_3$. The time period $T_s$ starts at time $t_0$ and ends at $t_3$. For example, $t_0 \leq t_1 \leq t_2 \leq t_3$. The time periods $T_{demag}$ and $T_r$ are within the time period $T_{off}$. The time period $T_s$ is the switching period of the system 300, and includes the time period $T_{on}$ and the time period $T_{off}$.

During the time period $T_{on}$, the power switch 308 is closed (e.g., on) as shown by the waveform 404. The voltage between the terminals 320 and 322 (e.g., $V_{ds}$) keeps at a low value 412 (e.g., approximately zero as shown by the waveform 402). The current that flows through the power switch 308 increases over time from a low value 410 (e.g., approximately zero at $t_0$) to a peak value 408 (e.g., $I_{pk}$ at $t_1$) as shown by the waveform 406.

At the beginning of the time period $T_{demag}$ (e.g., at $t_1$), the power switch 308 becomes open (e.g., being turned off) as shown by the waveform 404. The voltage between the terminals 320 and 322 (e.g., $V_{ds}$) increases from the low value 412 (e.g., approximately zero at $t_1$) as shown by the waveform 402. The current that flows through the power switch 308 drops from the peak value 408 to a low value 414 (e.g., approximately zero) as shown by the waveform 406.

During the time period $T_{demag}$, the power switch 308 remains open (e.g., off) as shown by the waveform 404. The current that flows through the power switch 308 remains at the low value 414 (e.g., approximately zero) as shown by the waveform 406. For example, the voltage between the terminals 320 and 322 (e.g., $V_{ds}$) can be determined according to Equation 1. The parasitic capacitance 314 (e.g., $C_P$) and the parasitic inductance 318 (e.g., $L_k$) cause high frequency resonation. The primary inductance of the transformer 334 (e.g., $L_p$) is demagnetized.

At the end of the time period $T_{demag}$ (e.g., at $t_2$), the demagnetization of the primary inductance 334 (e.g., $L_p$) is completed. The QR controller 302 detects a falling edge of a voltage 332 (e.g., $V_{DEM}$) at the auxiliary winding 330 that indicates the completion of the demagnetization.

During the time period $T_r$, the power switch 308 remains open (e.g., off) as shown by the waveform 404. The current that flows through the power switch 308 remains at the low value 414 (e.g., approximately zero) as shown by the waveform 406. The primary inductance 334 (e.g., $L_p$) and the parasitic capacitance 314 (e.g., $C_p$) cause resonation. The voltage between the terminals 320 and 322 (e.g., $V_{ds}$) decreases from a high value 418 (e.g., at $t_2$) to a valley value 416 (e.g., at $t_3$) as shown by the waveform 402. When the switch 308 is closed (e.g., on) at the beginning of a next switching period, the voltage between the terminals 320 and 322 (e.g., $V_{ds}$) is at the valley value 416. The current peaks caused by the parasitic capacitance 314 (e.g., $C_p$) through the power switch 308 is often reduced, and thus the switching loss and the EMI of the system 300 is often improved.

As shown in FIG. 4, the time period $T_r$ during which the parasitic capacitance 314 (e.g., $C_p$) and the primary inductance 334 (e.g., $L_p$) resonate is less than the switching period $T_s$ of the system 300. The system 300 operates approximately in a boundary-conduction mode (BCM). The output power of the system 300 can be determined based on the following equation.

$$P_{out} = \eta \times \frac{I_{pk}}{2} \times \left[ \frac{N \times (V_{out} + V_F) \times V_{in\_DC}}{N \times (V_{out} + V_F) + V_{in\_DC}} \right] \qquad \text{(Equation 2)}$$

where $P_{out}$ represents the output power of the system 300, $\eta$ represents the power transfer efficiency of the system 300, and $I_{pk}$ represents the peak current on the primary side of the system 300. Additionally, N represents a turns ratio between the primary winding 304 and the secondary winding 306, $V_{out}$ represents the output voltage on the secondary side of the system 300, and $V_F$ represents the voltage drop on the rectifying diode 310. Furthermore, $V_{in\_DC}$ represents the voltage level of the input voltage 326 (e.g., a power-factor-correction output voltage, or a line input rectified voltage), and D represents a turn-on duty cycle of the power switch 308.

The switching frequency of the system 300 can be determined based on the following equation.

$$f_s = \frac{\eta \times V_{in\_DC}^2}{2 \times L_P \times P_{out}} \times D^2 = \qquad \text{(Equation 3)}$$

$$\frac{\eta}{2 \times L_P \times P_{out}} \times \left[ \frac{N \times (V_{out} + V_F)}{1 + \frac{N \times (V_{out} + V_F)}{V_{in\_DC}}} \right]^2$$

where $f_s$ represents the switching frequency of the system 300, $L_p$ represents the inductance of the primary winding 304, and $P_{out}$ represents the output power of the system 300. Additionally, $\eta$ represents the power transfer efficiency of the system 300, $I_{pk}$ represents the peak current on the primary side of the system 300, and N represents a turns ratio between the primary winding 304 and the secondary winding 306. Furthermore, $V_{out}$ represents the output voltage on the secondary side of the system 300, $V_F$ represents the voltage drop on the rectifying diode 310, $V_{in\_Dc}$ represents the voltage level of the input voltage 326 (e.g., a power-factor-correction output voltage, or a line input rectified voltage), and D represents the turn-on duty cycle of the power switch 308.

According to Equations 1 and 2, the switching frequency of the system 300 often remains approximately constant, if the output load 316 and the input voltage 326 do not change. The frequency range for energy distribution of the conduction EMI is usually narrow. The conduction EMI cannot be reduced significantly in the conventional fly-back power conversion system 300 using the QR techniques.

FIG. 5 is a simplified diagram showing a conventional power conversion system including a QR controller. The power conversion system 500 includes a QR controller 502, a primary winding 504, a secondary winding 506, a power switch 508, a rectifying diode 510, a capacitor 512, an error-amplification-and-isolation component 516, a current sensing resistor 518, an auxiliary winding 520, and two resistors 522 and 524. The QR controller 502 includes a demagnetization detection component 526, a flip-flop 528, a gate driver 530, a PWM comparator 532, a diode 534, and two resistors 536 and 538. The QR controller 502 further includes four terminals 540, 542, 544 and 546. For example, the power switch 508 is a field-effect transistor (FET), a bipolar junction transistor (BJT) or an insulated-gate bipolar transistor (IGBT).

As shown in FIG. 5, the error-amplification-and-isolation component 516 receives the output voltage 548 on the secondary side of the system 500, and outputs a feedback signal 550 to the terminal 540 (e.g., terminal FB). The feedback signal 550 is received by at least the diode 534. In response, the resistors 536 and 538 generate a signal 552 to a non-inverting input terminal of the PWM comparator 532.

A primary current 554 that flows through the primary winding 504 is sensed by the current sensing resistor 518, which in response outputs the sensed signal 556 to the terminal 546 (e.g., terminal CS). The sensed signal 556 is received at an inverting input terminal of the PWM comparator 532. The PWM comparator 532 generates a comparison signal 558 based on the signal 552 and the sensed signal 556.

The resistors 522 and 524 receive an auxiliary current 560 that flows through the auxiliary winding 520, and in response outputs a demagnetization signal 562 to the terminal 542 (e.g., terminal dem). The demagnetization detection component 526 receives the demagnetization signal 562, and outputs a detection signal 564. The flip-flop 528 receives the comparison signal 558 at one input terminal, and the detection signal 564 at another input terminal. In response, the flip-flop 528 outputs a signal 566 to the gate driver 530. The gate driver 530 outputs a gate drive signal 568 through the terminal 544 (e.g., terminal gate) to drive the power switch 508.

The feedback signal 550 generated by the error-amplification-and-isolation component 516 is often used to control the peak values of the current 554 in order to regulate the output voltage 548. To make the system 500 operate stably, the error-amplification-and-isolation component 516 is usually compensated, and the bandwidth is often limited to below one-tenth or one-fifteenth of the switching frequency. Similar to what is discussed in FIGS. 3 and 4, the conduction EMI cannot be reduced significantly in the conventional power conversion system 500 using the conventional QR controller 502.

Hence it is highly desirable to improve techniques for reducing the EMI.

3. BRIEF SUMMARY OF THE INVENTION

The present invention is directed to integrated circuits. More particularly, the invention provides systems and methods for reducing electromagnetic interference (EMI) using switching frequency jittering in the quasi-resonant mode. Merely by way of example, the invention has been applied to a power conversion system. But it would be recognized that the invention has a much broader range of applicability.

According to one embodiment, a system for regulating a power converter includes a signal processing component. The signal processing component is configured to receive a first input signal and a second input signal, process information associated with the first input signal and the second input signal, and output a drive signal to a switch based on at least information associated with the first input signal and the second input signal, the drive signal being associated with a switching frequency related to a power converter including the switch. The first input signal is associated with at least a feedback signal related to an output voltage of the power converter. The second input signal is associated with at least a primary current flowing through a primary winding of the power converter. Furthermore, the signal processing component is further configured to change a peak value of the primary current within a first predetermined range, and change the switching frequency of the power converter within a second predetermined range.

According to another embodiment, a system for regulating a power converter includes a comparator and a driving component. The comparator is configured to receive a first input signal and a second input signal and generate a comparison signal based on at least information associated with the first input signal and the second input signal, the first input signal being associated with at least a feedback signal related to an output voltage of a power converter, the second input signal including a third input signal and being associated with at least a primary current flowing through a primary winding of the power converter. The driving component is configured to receive the comparison signal and output a drive signal to a switch based on at least information associated with the comparison signal, the drive signal being associated with a switching frequency related to the power converter including the switch. The comparator and the driving component are configured to, in response to at least the third input signal, change a peak value of the primary current within a first predetermined range and change the switching frequency of the power converter within a second predetermined range.

According to yet another embodiment, a system for regulating a power converter includes a comparator and a driving component. The comparator is configured to receive a first input signal and a second input signal and generate a comparison signal based on at least information associated with the first input signal and the second input signal, the first input signal including a third input signal and being associated with at least a feedback signal related to an output voltage of a power converter, the second input signal being associated with at least a primary current flowing through a primary winding of the power converter. The driving component is configured to receive the comparison signal and output a drive signal to a switch based on at least information associated with the comparison signal, the drive signal being associated with a switching frequency related to the power converter including the switch. The comparator and the driving component are configured to, in response to at least the third input signal, change a peak value of the primary current within a first predetermined range and change the switching frequency of the power converter within a second predetermined range.

According to yet another embodiment, a method for regulating a power converter includes receiving a first input signal and a second input signal, the first input signal being associated with at least a feedback signal related to an output voltage of a power converter, the second input signal being associated with at least a primary current flowing through a primary winding of the power converter, processing information associated with the first input signal and the second input signal, and outputting a drive signal to a switch based on at least information associated with the first input signal and the second input signal, the drive signal being associated with a switching frequency related to the power converter including the switch. The method further includes changing, within a first predetermined range, a peak value of the primary current, and changing, within a second predetermined range, the switching frequency of the power converter.

In another embodiment, a method for regulating a power converter includes receiving a first input signal and a second input signal, the first input signal being associated with at least a feedback signal related to an output voltage of a power converter, the second input signal including a third input signal and being associated with at least a primary current flowing through a primary winding of the power converter, processing information associated with the first input signal and the second input signal, and generating a comparison signal based on at least information associated with the first input signal and the second input signal. The method further includes receiving the comparison signal, processing information associated with the comparison signal, and outputting a drive signal to a switch based on at least information associated with the comparison signal, the drive signal being associated with a switching frequency related to the power converter including the switch. Additionally, the method includes changing, in response to at least the third input signal, a peak value of the primary current within a first predetermined range, and changing, in response to at least the third input signal, the switching frequency of the power converter within a second predetermined range.

In yet another embodiment, a method for regulating a power converter includes receiving a first input signal and a second input signal, the first input signal including a third input signal and being associated with at least a feedback signal related to an output voltage of a power converter, the second input signal being associated with at least a primary current flowing through a primary winding of the power converter, processing information associated with the first input signal and the second input signal, and generating a comparison signal based on at least information associated with the first input signal and the second input signal. The method further includes receiving the comparison signal, processing information associated with the comparison signal, and outputting a drive signal to a switch based on at least information associated with the comparison signal, the drive signal being associated with a switching frequency related to the power converter including the switch. Additionally, the method includes changing, in response to at least the third input signal, a peak value of the primary current within a first predetermined range, and changing, in response to at least the third input signal, the switching frequency of the power converter within a second predetermined range.

Many benefits are achieved by way of the present invention over conventional techniques. Certain embodiments of the present invention use switching frequency jittering to reduce EMI. Some embodiments of the present invention add a jittering signal to a peak current of a primary inductance to change the switching frequency. Certain embodiments of the present invention provide a disturbance to the peak current of the primary inductance, which changes with output load. Some embodiments of the present invention provide valley conduction to reduce switching loss to improve system efficiency. Certain embodiments of the present invention provide a jittering signal at a feedback terminal or a current sensing terminal to produce switching frequency jittering. Some embodiments of the present invention distribute conduction EMI energy over a broad frequency range to reduce the EMI.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides systems and methods for reducing electromagnetic interference (EMI) using switching frequency jittering in the quasi-resonant mode. Merely by way of example, the invention has been applied to a power conversion system. But it would be recognized that the invention has a much broader range of applicability.

Figure 1:
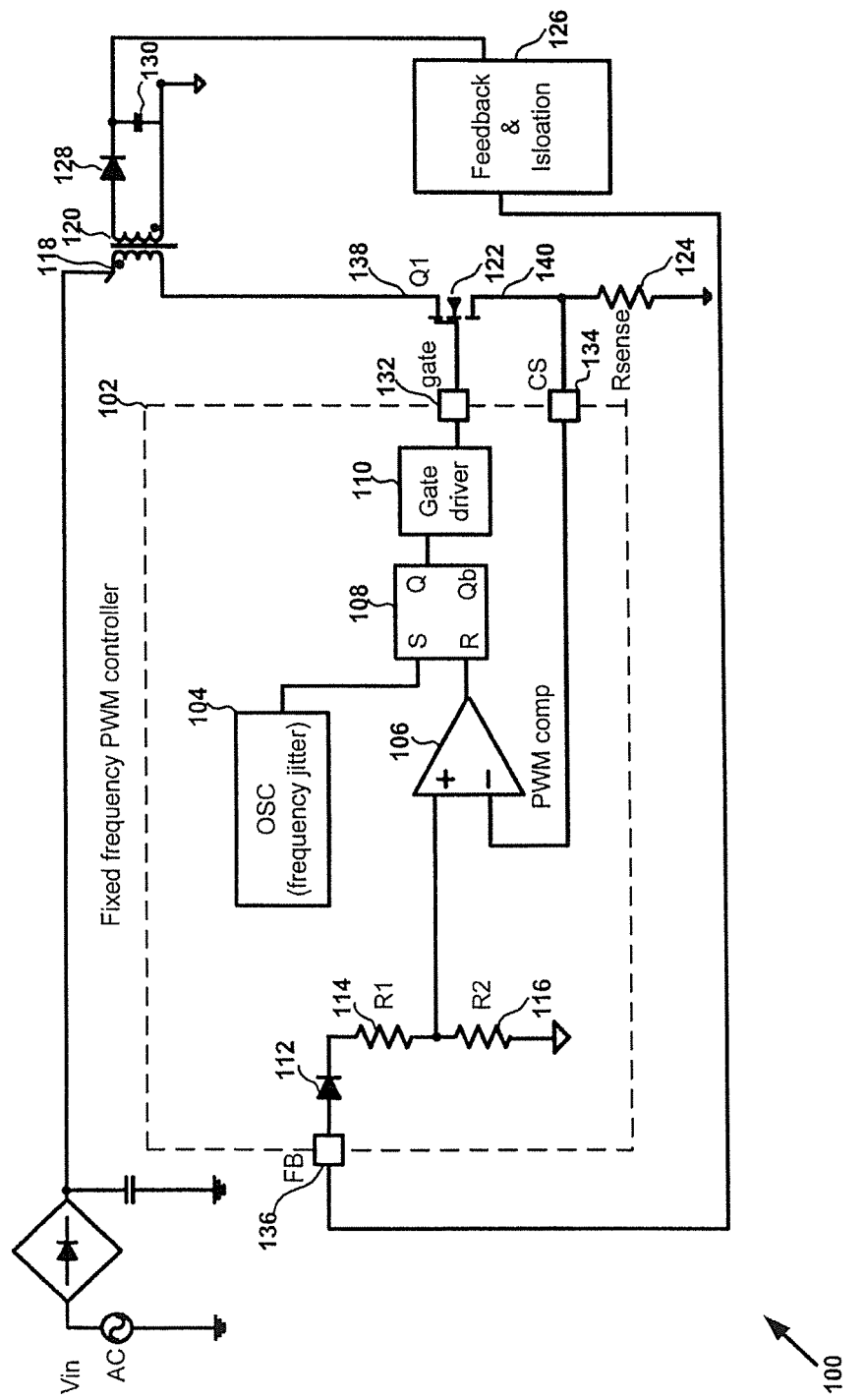
FIG. 1 is a simplified diagram showing a conventional power conversion system including a fixed-frequency pulse-width-modulation (PWM) controller.
Figure 2:
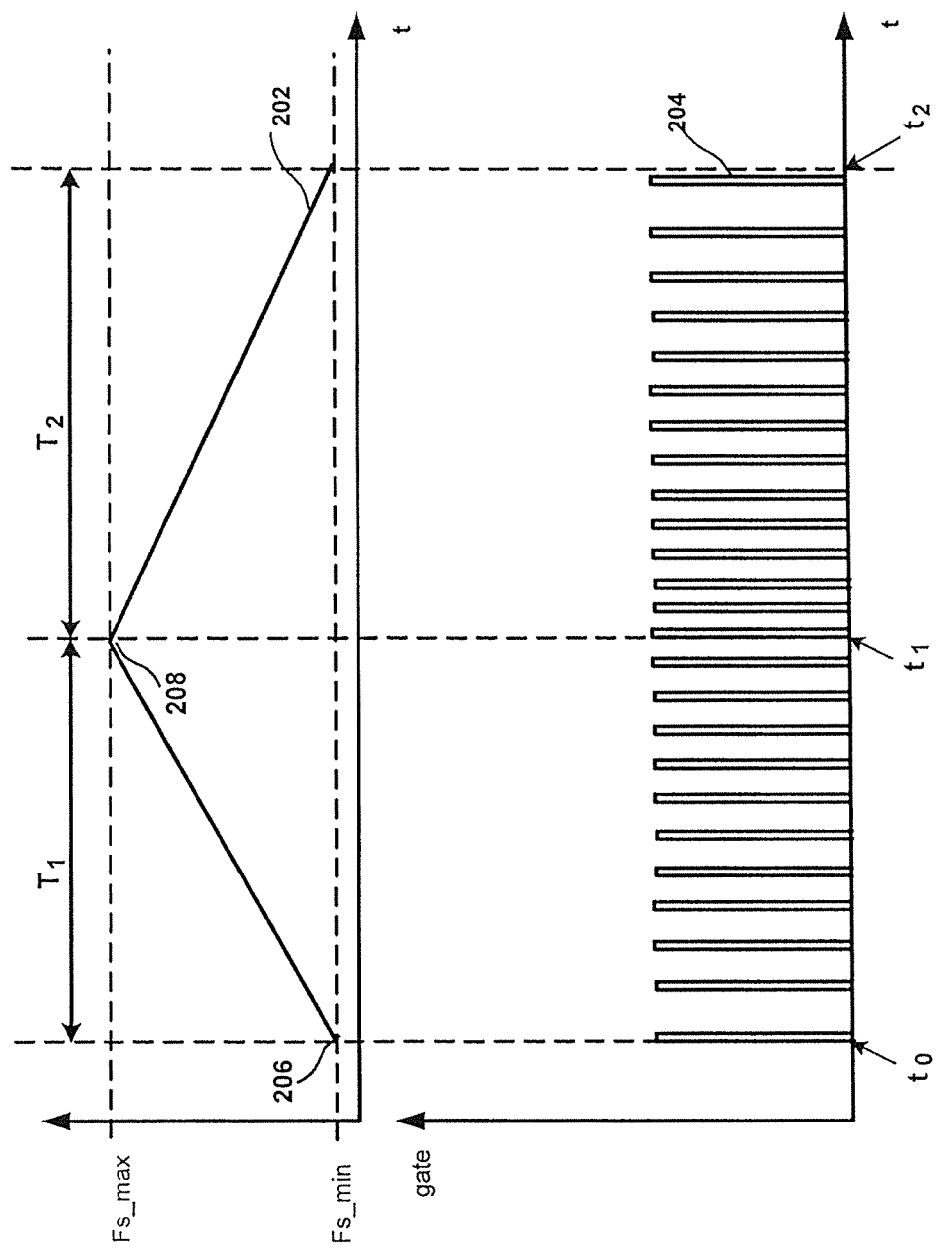
FIG. 2 is a simplified conventional timing diagram for a power conversion system showing frequency jittering by ramping up and down the switching frequency by an oscillator.
Figure 3:
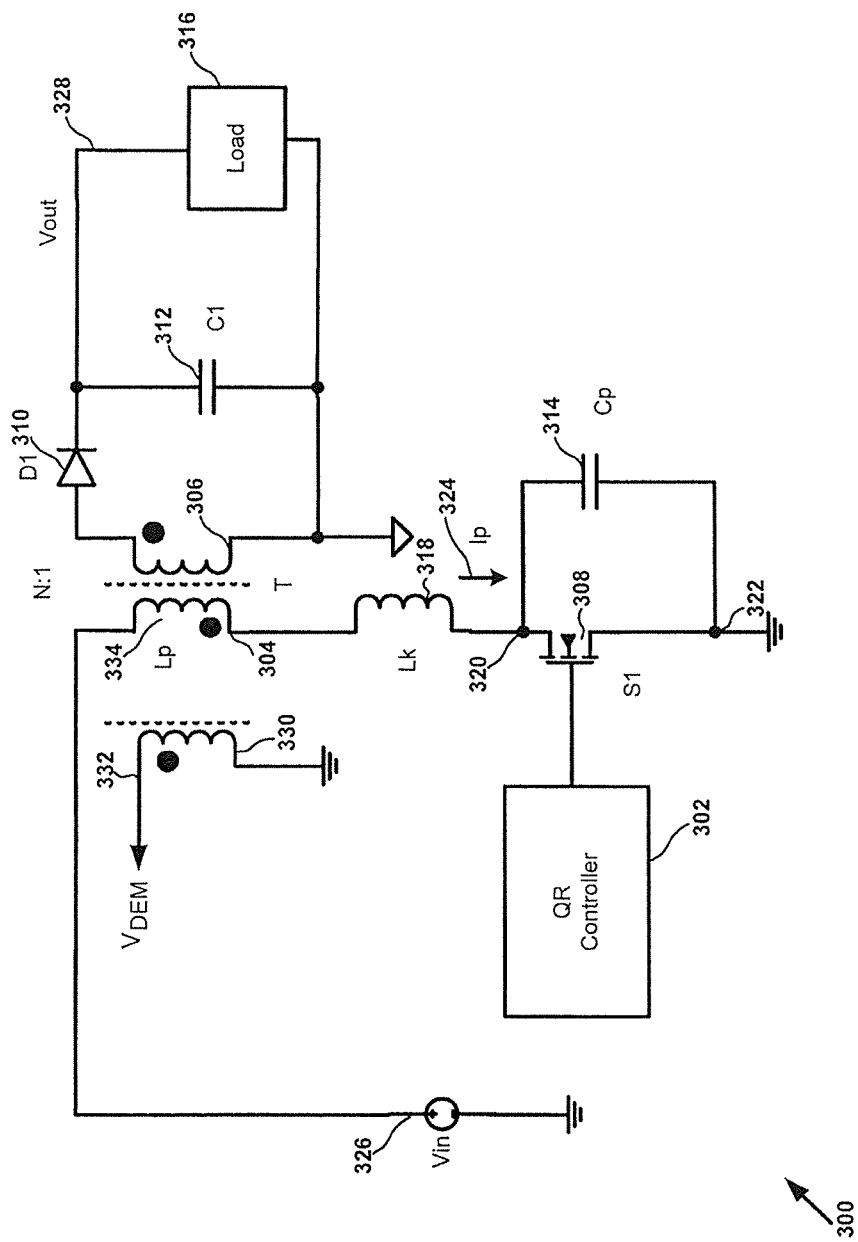
FIG. 3 is a simplified diagram showing a conventional fly-back power conversion system including a QR controller.
Figure 4:
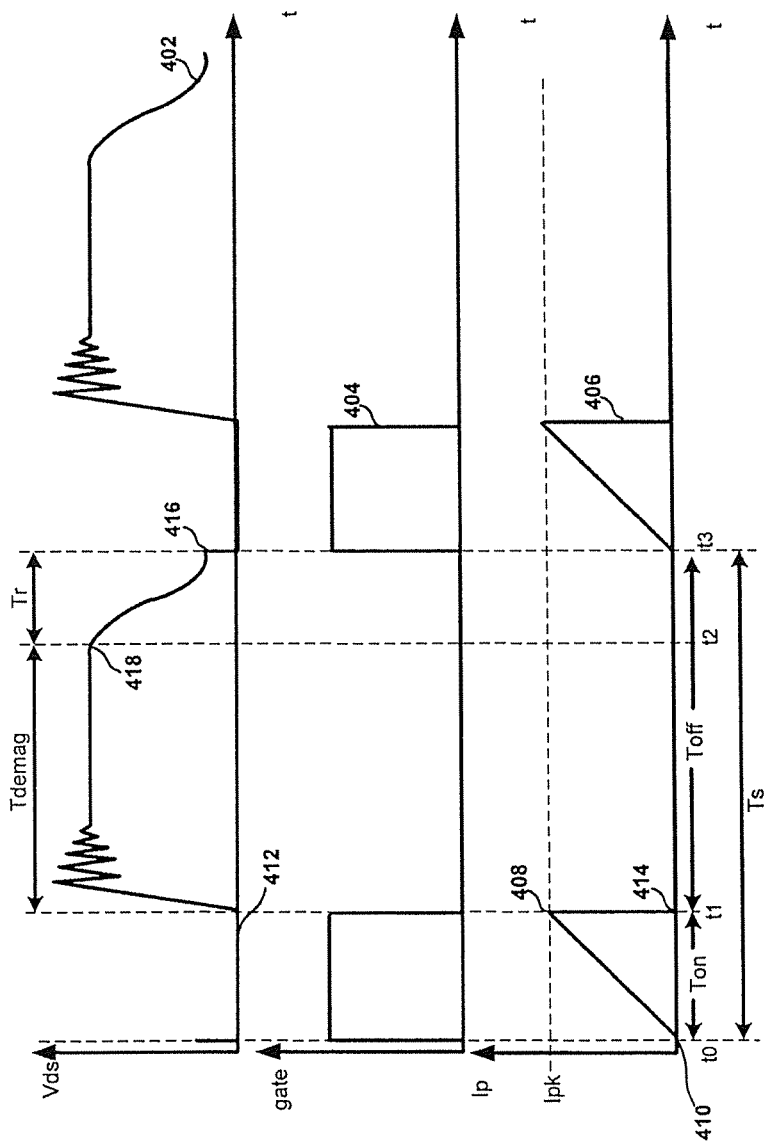
FIG. 4 is a simplified conventional timing diagram for a power conversion system.

As discussed in FIGS. 1 and 2, switching frequency jittering can be used to reduce the conduction EMI. But as discussed in FIG. 3, it is hard to achieve switching frequency jittering in the conventional QR system 300.

Figure 5:
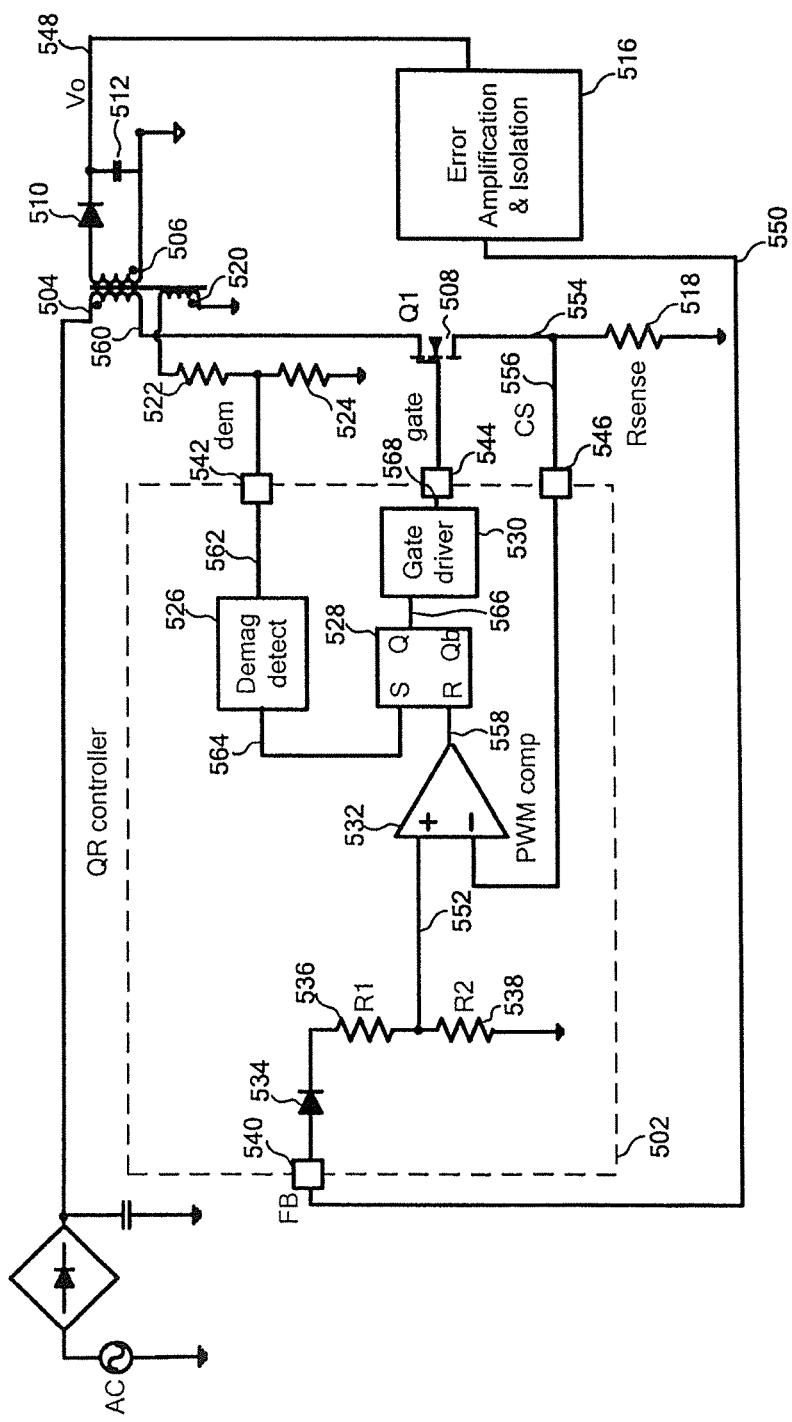
FIG. 5 is a simplified diagram showing a conventional power conversion system including a QR controller.

Referring to FIG. 5, the switching frequency of the power conversion system 500 can be determined based on the following equation.

$$F_s = \frac{1}{I_{pk} \times L_P} \times \left[ \frac{N \times (V_{out} + V_F) \times V_{in\_DC}}{N \times (V_{out} + V_F) + V_{in\_DC}} \right] \quad \text{(Equation 4)}$$

where $F_s$ represents the switching frequency of the system 500, $L_p$ represents the inductance of the primary winding 504, and $P_{out}$ represents the output power of the system 500. Additionally, $\eta$ represents the power transfer efficiency of the system 500, $I_{pk}$ represents the peak current on the primary side of the system 500, and N represents a turns ratio between the primary winding 504 and the secondary winding 506. Furthermore, $V_{out}$ represents the output voltage 548 on the secondary side of the system 500, $V_F$ represents the voltage drop on the rectifying diode 510, $V_{in\_DC}$ represents the voltage level of the input voltage of the system 500 (e.g., a power-factor-correction output voltage, or a line input rectified voltage), and D represents the turn-on duty cycle of the power switch 508.

According to Equation 4, the switching frequency of the system 500 is inversely proportional to the peak current on the primary side of the system 500. Hence, a new QR controller can be properly constructed to disturb the peak values of the current 554 (e.g., $I_{pk}$) in order to achieve the switching frequency jittering according to certain embodiments of the present invention.

Figure 6:
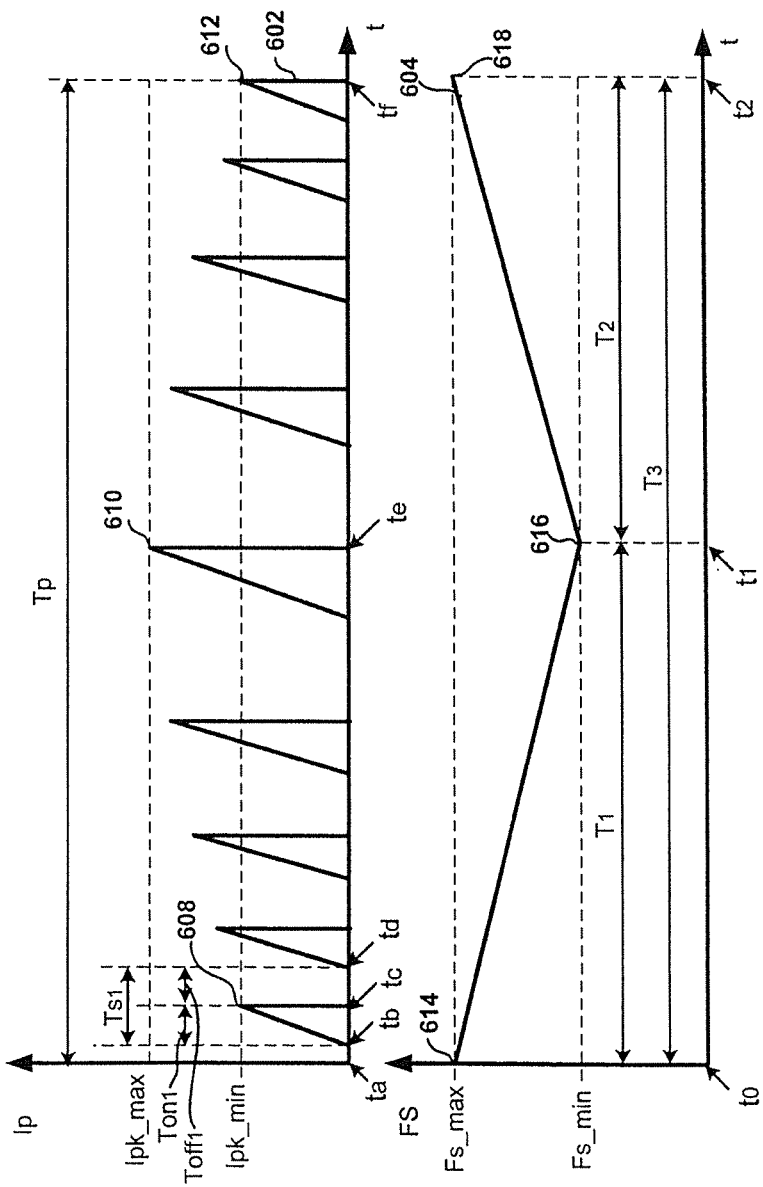
FIG. 6 is a simplified timing diagram showing switching frequency jittering achieved through deterministic peak-current disturbance according to an embodiment of the present invention.

FIG. 6 is a simplified timing diagram showing switching frequency jittering achieved through deterministic peak-current disturbance according to an embodiment of the present invention. This diagram is merely an example, which should not unduly limit the scope of the claims. One of ordinary skill in the art would recognize many variations, alternatives, and modifications. For example, switching frequency jittering can be achieved through deterministic peak-current disturbance using a new QR controller that replaces the QR controller 502 in the system 500 according to an embodiment of the present invention.

The waveform 602 represents the current 554 (e.g., $I_p$) that flows through the primary winding 504 as a function of time, and the waveform 604 represents the switching frequency of the system 500 (e.g., $F_s$) as a function of time. Seven time periods $T_1$ $T_2$, $T_3$, $T_{on1}$, $T_{off1}$, $T_{s1}$, and $T_p$ are shown in FIG. 6. The time period $T_1$ starts at time $t_0$ and ends at time $t_1$, the time period $T_2$ starts at the time $t_1$ and ends at time $t_2$, and the time period $T_3$ starts at the time $t_0$ and ends at $t_2$. The time period $T_{on1}$ starts at time $t_b$ and ends at time $t_0$, the time period $T_{off1}$ starts at the time $t_c$ and ends at time $t_d$, and the time period $T_{s1}$ starts at the time $t_b$ and ends at the time $t_d$. The time period $T_p$ starts at time $t_0$ and ends at time $t_f$. The times $t_e$ and $t_f$ are outside the time period $T_{s1}$. For example, $t_0 \le t_1 \le t_2$. In another example, $t_a \le t_b \le t_c \le t_d \le t_e \le t_f$.

According to one embodiment, during a time period (e.g., $T_{on1}$) when the power switch 508 is closed (e.g., on), the current 554 (e.g., $I_p$) increases from a low value (e.g., approximately zero at $t_b$) to a peak value (e.g., the peak-current value 608 at $t_0$) as shown by the waveform 602. For example, the peak value of the current 554 (e.g., $I_{pk}$) changes as a predetermined function of time. In another example, before $t_e$, the peak values of the current 554 (e.g., $I_{pk}$) ramps up over time (e.g., from the peak-current value 608 at $t_0$ to the peak-current value 610 at $t_e$) as shown by the waveform 602. In yet another example, before $t_e$, the peak values of the current 554 (e.g., $I_{pk}$) increase corresponding to a linear or non-linear function of time. In yet another example, before $t_e$, peak values of the current 554 (e.g., $I_{pk}$) all lie in a straight line.

According to yet another embodiment, after $t_e$, the peak values of the current 554 (e.g., $I_{pk}$) ramps down (e.g., from the peak-current value 610 at $t_e$ to the peak-current value 612 at $t_f$) as shown by the waveform 602. In yet another example, after $t_e$, the peak values of the current 554 (e.g., $I_{pk}$) decrease corresponding to a linear or non-linear function of time. In yet another example, after $t_e$, peak values of the current 554 (e.g., $I_{pk}$) all lie in a straight line. In yet another example, the increase of the peak values of the current 554 (e.g., from the peak-current value 608 at $t_e$ to the peak-current value 610 at $t_e$) is symmetrical to the decrease of the peak values of the current 554 (e.g., from the peak-current value 610 at $t_e$ to the peak-current value 612 at $t_f$). In yet another example, the peak values of the current 554 (e.g., $I_{pk}$) varies in a predetermined range (e.g., between $I_{pk\_min}$ and $I_{pk\_max}$). In yet another example, the peak-current value 608 is equal to $I_{pk\_min}$. In yet another example, the peak-current value 610 is equal to $I_{pk\_max}$. In yet another example, the peak-current value 612 is equal to $I_{pk\_min}$.

According to yet another embodiment, during a time period (e.g., $T_{off1}$) when the power switch 508 is open (e.g., off), the current 554 (e.g., $I_p$) keeps at a low value (e.g., approximately zero). For example, a switching period (e.g., $T_{s1}$) includes the time period (e.g., $T_{on1}$) when the power switch 508 is closed (e.g., on) and the time period (e.g., $T_{off1}$) when the power switch 508 is open (e.g., off). In another example, the length of a particular switching period (e.g., $T_{s1}$) is proportional to the peak value of the current 554 (e.g., $I_{pk}$) during the switching period (e.g., $T_{s1}$). Hence, the switching frequency of the system 500 is inversely proportional to the peak value of the current 554 (e.g., $I_{pk}$) according to certain embodiments.

According to yet another embodiment, during the time period $T_1$, the switching frequency of the system 500 decreases over time from a high value (e.g., the frequency value 614 at $t_0$) to a low value (e.g., the frequency value 616 at $t_1$), as shown by the waveform 604. For example, the switching frequency of the system 500 decreases as a linear or non-linear function of time. In another example, during the time period $T_2$, the switching frequency of the system 500 increases over time from the low value (e.g., the frequency value 616 at $t_1$) to another high value (e.g., the frequency value 618 at $t_2$), as shown by the waveform 604. In yet another example, the switching frequency of the system 500 increases as a linear or non-linear function of time. In yet another example, the switching frequency varies in a predetermined range (e.g., between $F_{s\_min}$ and $F_{s\_max}$). In yet another example, the frequency value 614 is equal to $F_{s\_max}$. In yet another example, the frequency value 616 is equal to $F_{s\_min}$. In yet another example, the frequency value 618 is equal to $F_{s\_max}$.

According to yet another embodiment, the peak values of the current 554 (e.g., $I_{pk}$) are disturbed periodically. For example, the time period $T_p$ is equal to the period of peak value disturbance of the current 554 (e.g., $I_{pk}$). In another example, the switching frequency of the system 500 varies periodically. In yet another example, the time period $T_3$ is equal to the period of the switching frequency variation. In yet another example, the time period $T_p$ is equal to the time period $T_3$. In yet another example, if the bandwidth of the feedback loop of the system 500 is lower than the frequency of the peak-current changes, disturbing the peak-current values deterministically achieves the switching frequency jittering.

Figure 7:
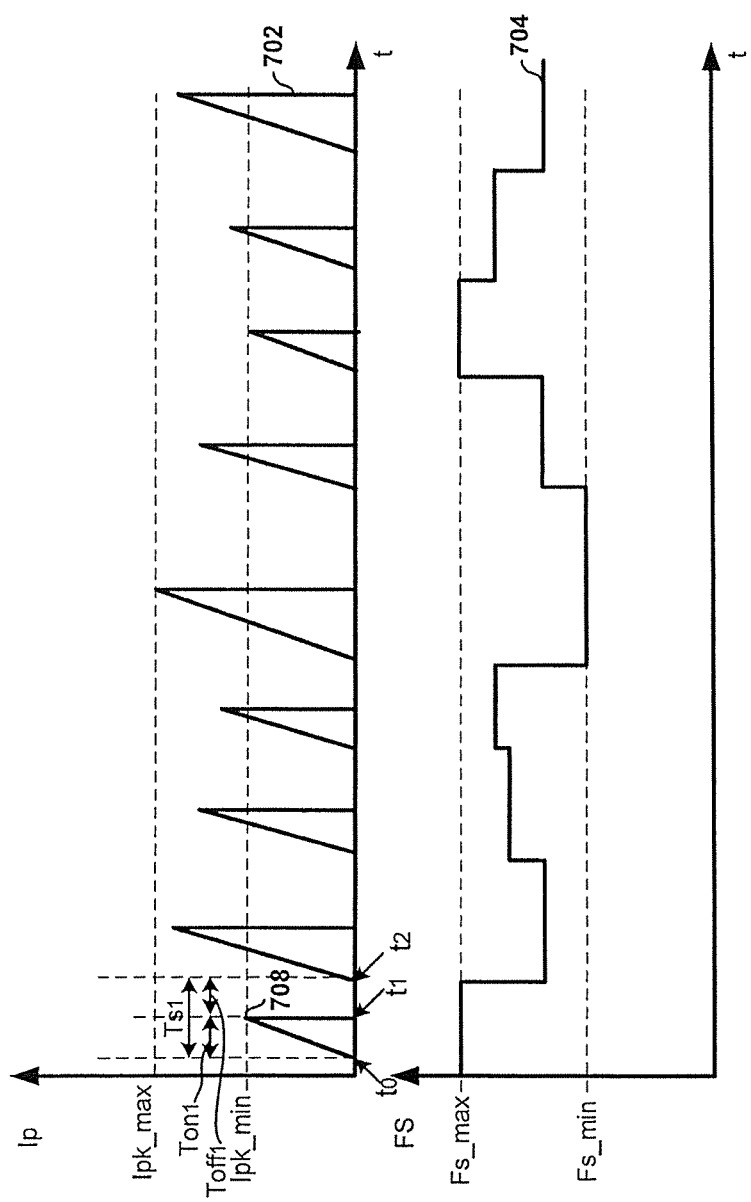
FIG. 7 is a simplified timing diagram showing switching frequency jittering achieved through random (e.g., pseudo-random) peak-current disturbance according to another embodiment of the present invention.

FIG. 7 is a simplified timing diagram showing switching frequency jittering achieved through random (e.g., pseudo-random) peak-current disturbance according to another embodiment of the present invention. This diagram is merely an example, which should not unduly limit the scope of the claims. One of ordinary skill in the art would recognize many variations, alternatives, and modifications. For example, switching frequency jittering can be achieved through random peak-current disturbance using a new QR controller that replaces the QR controller 502 in the system 500 according to an embodiment of the present invention.

The waveform 702 represents the current 554 (e.g., $I_p$) that flows through the primary winding 504 as a function of time, and the waveform 704 represents the switching frequency of the system 500 (e.g., $F_s$) as a function of time. Three time periods $T_{on1}$, $T_{off1}$ and $T_{s1}$ are shown in FIG. 7. The time period $T_{on1}$ starts at time $t_0$ and ends at time $t_1$, and the time period $T_{off1}$ starts at the time $t_1$ and ends at time $t_2$. The time period $T_{s1}$ starts at the time $t_0$ and ends at the time $t_2$. For example, $t_0 \le t_1 \le t_2$.

According to one embodiment, during a time period (e.g., $T_{on1}$) when the power switch 508 is closed (e.g., on), the current 554 (e.g., $I_p$) increases from a low value (e.g., approximately zero at $t_0$) to a peak value (e.g., the peak-current value 708 at $t_1$) as shown by the waveform 702. For example, during a time period (e.g., $T_{off1}$) when the power switch 508 is open (e.g., off), the current 554 (e.g., $I_p$) keeps at a low value (e.g., approximately zero). In another example, the peak value of the current 554 (e.g., $I_{pk}$) of a particular switching period (e.g., $T_{s1}$) varies randomly (e.g., pseudo-randomly) in a predetermined range (e.g., between $I_{pk\_min}$ and $I_{pk\_max}$) as shown by the waveform 702.

According to another embodiment, the length of a particular switching period (e.g., $T_{s1}$) is proportional to the peak value of the current 554 (e.g., $I_{pk}$) during the switching period (e.g., $T_{s1}$). Hence, the switching frequency of the system 500 is inversely proportional to the peak value of the current 554 (e.g., $I_{pk}$) according to certain embodiments. For example, the switching frequency of the system 500 varies randomly (e.g., pseudo-randomly) within a predetermined range (e.g., between $F_{s\_min}$ and $F_{s\_max}$), as shown by the waveform 704. In another example, if the bandwidth of the feedback loop of the system 500 is lower than the frequency of the peak-current value changes, disturbing the peak-current values randomly (e.g., pseudo-randomly) achieves the switching frequency jittering.

Figure 8:
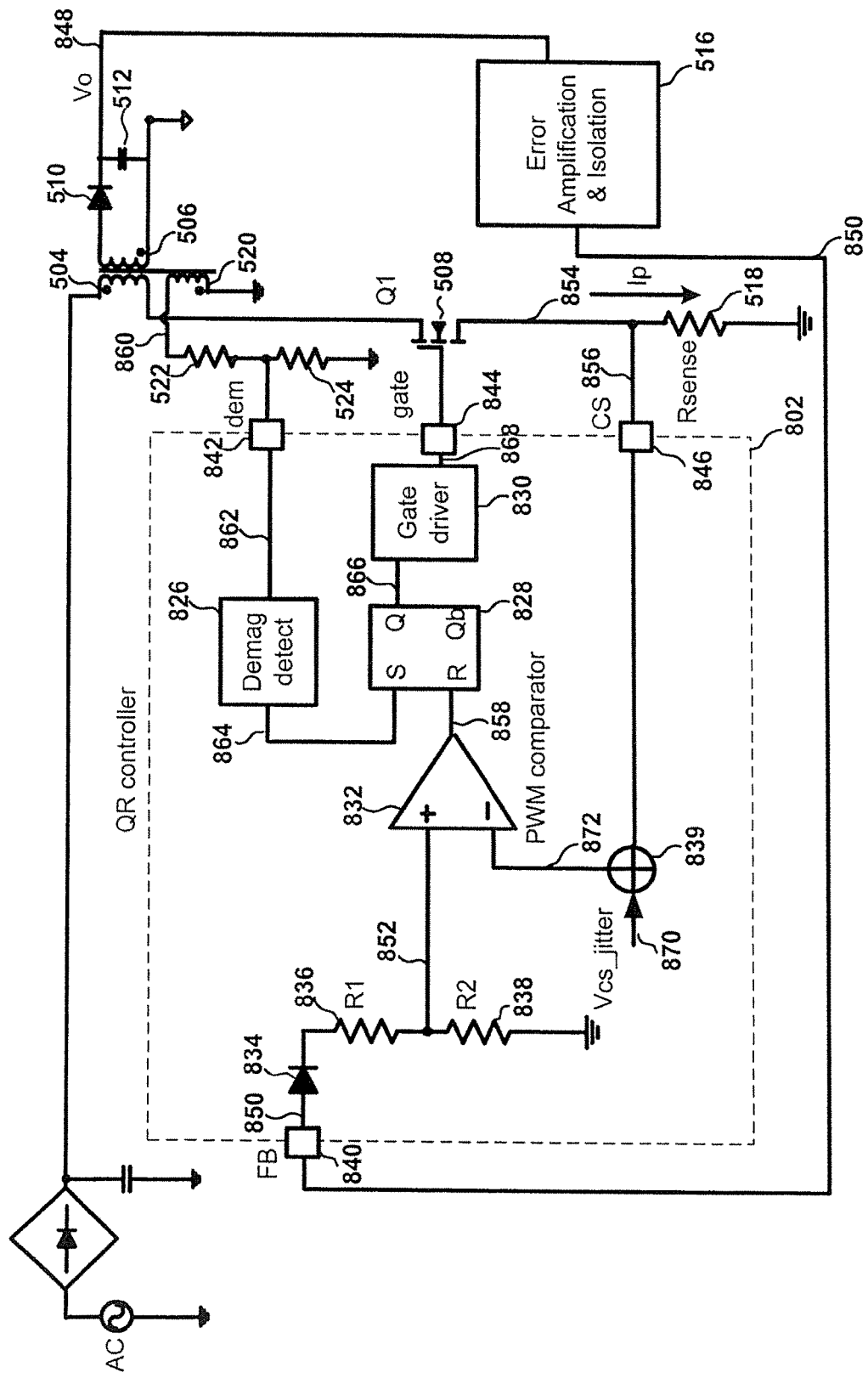
FIG. 8 is a simplified diagram showing a power conversion system including a QR controller according to an embodiment of the present invention.

FIG. 8 is a simplified diagram showing a power conversion system including a QR controller according to an embodiment of the present invention. This diagram is merely an example, which should not unduly limit the scope of the claims. One of ordinary skill in the art would recognize many variations, alternatives, and modifications. For example, FIG. 8 is implemented according to FIG. 6 or FIG. 7.

The power conversion system 800 includes a QR controller 802, the primary winding 504, the secondary winding 506, the power switch 508, the rectifying diode 510, the capacitor 512, the error-amplification-and-isolation component 516, the current sensing resistor 518, the auxiliary winding 520, and the resistors 522 and 524. The QR controller 802 includes a demagnetization detection component 826, a flip-flop 828, a gate driver 830, a PWM comparator 832, a diode 834, two resistors 836 and 838, and a combining component 839. The QR controller 802 further includes four terminals 840, 842, 844 and 846. For example, the combining component 839 is an adder, a subtractor, or a multiplexer.

According to one embodiment, the demagnetization detection component 826, the flip-flop 828, the gate driver 830, the PWM comparator 832, the diode 834, and the resistors 836 and 838 are the same as the demagnetization detection component 526, the flip-flop 528, the gate driver 530, the PWM comparator 532, the diode 534, and the resistors 536 and 538. For example, the terminals 840, 842, 844 and 846 are the same as the terminals 540, 542, 544 and 546.

According to one embodiment, the error-amplification-and-isolation component 516 receives the output voltage 848 on the secondary side of the system 800, and outputs a feedback signal 850 to the terminal 840 (e.g., terminal FB). For example, the feedback signal 850 is received by at least the diode 834. In another example, the resistors 836 and 838 output a signal 852 to a non-inverting input terminal of the PWM comparator 832.

According to another embodiment, a primary current 854 that flows through the primary winding 504 is sensed by the current sensing resistor 518. For example, the current sensing resistor 518 in response outputs the sensed signal 856 to the terminal 846 (e.g., terminal CS). In another example, the combining component 839 receives the sensed signal 856 and a voltage-jittering signal 870 (e.g., $V_{CS\_jitter}$), and in response generates a combined signal 872. In yet another example, the combined signal 872 is received at an inverting input terminal of the PWM comparator 832. In yet another example, the PWM comparator 832 generates a comparison signal 858 based on the signal 852 and the combined signal 872.

According to yet another embodiment, the resistors 522 and 524 receive an auxiliary current 860 that flows through the auxiliary winding 520, and in response outputs a demagnetization signal 862 to the terminal 842 (e.g., terminal dem). For example, the demagnetization detection component 826 receives the demagnetization signal 862, and outputs a detection signal 864. In another example, the flip-flop 828 receives the comparison signal 858 at one input terminal, and the detection signal 864 at another input terminal. In yet another example, the flip-flop 828 outputs a signal 866 to the gate driver 830. In yet another example, the gate driver 830 outputs a gate drive signal 868 through the terminal 844 (e.g., terminal gate) to drive the power switch 508.

According to yet another embodiment, with a certain output load, the disturbance to the peak values of the current 854 can be determined based on the following equation.

$$\Delta I_{pk} = \frac{V_{CS\_jitter}}{R_{sense}} \quad \text{(Equation 5)}$$

where $\Delta I_{pk}$ represents the disturbance to the peak values of the current 854, $V_{CS\_jitter}$ represents the voltage-jittering signal 870, and $R_{sense}$ represents the resistance of the resistor 518. For example, the peak values of the current 854 are disturbed by the voltage-jittering signal 870. Hence, the switching frequency of the system 800 jitters according to certain embodiments. In another example, the frequency of the voltage-jittering signal 870 is higher than the bandwidth of the error-amplification-and-isolation component 516, and the feedback signal 850 remains approximately constant in magnitude during a jittering period. In yet another example, the voltage-jittering signal 870 changes over time. In yet another example, the amplitude of the voltage-jittering signal 870 changes continuously over time. In yet another example, the amplitude of the voltage-jittering signal 870 is randomly determined (e.g., pseudo-randomly determined).

Figure 9:
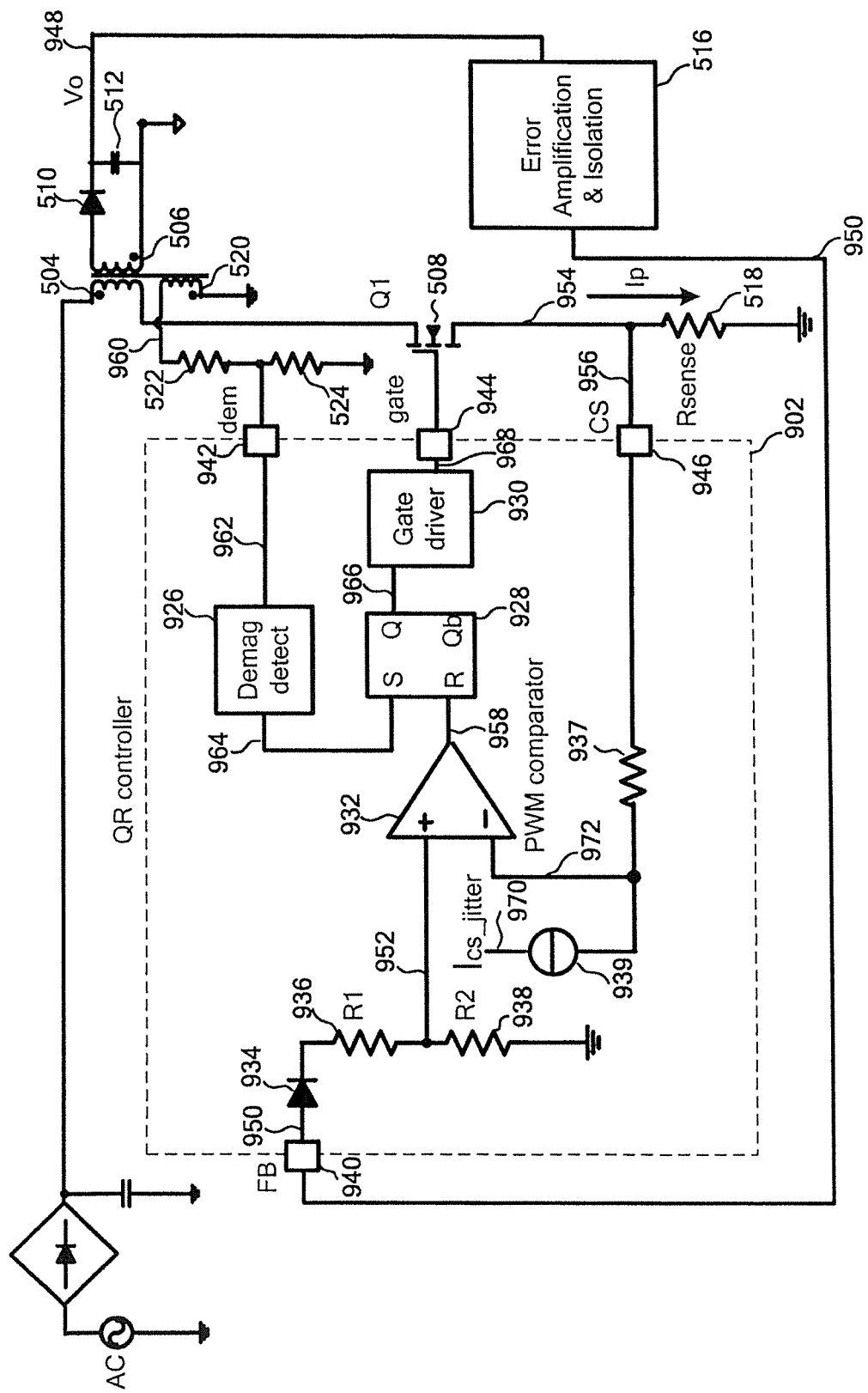
FIG. 9 is a simplified diagram showing a power conversion system including a QR controller according to another embodiment of the present invention.

FIG. 9 is a simplified diagram showing a power conversion system including a QR controller according to another embodiment of the present invention. This diagram is merely an example, which should not unduly limit the scope of the claims. One of ordinary skill in the art would recognize many variations, alternatives, and modifications. For example, FIG. 9 is implemented according to FIG. 6 or FIG. 7.

The power conversion system 900 includes a QR controller 902, the primary winding 504, the secondary winding 506, the power switch 508, the rectifying diode 510, the capacitor 512, the error-amplification-and-isolation component 516, the current sensing resistor 518, the auxiliary winding 520, and the resistors 522 and 524. The QR controller 902 includes a demagnetization detection component 926, a flip-flop 928, a gate driver 930, a PWM comparator 932, a diode 934, three resistors 936, 937 and 938, and a circuit component 939. The QR controller 902 further includes four terminals 940, 942, 944 and 946. For example, the circuit component 939 is a current source.

According to one embodiment, the demagnetization detection component 926, the flip-flop 928, the gate driver 930, the PWM comparator 932, the diode 934, and the resistors 936 and 938 are the same as the demagnetization detection component 526, the flip-flop 528, the gate driver 530, the PWM comparator 532, the diode 534, and the resistors 536 and 538. For example, the terminals 940, 942, 944 and 946 are the same as the terminals 540, 542, 544 and 546.

According to one embodiment, the error-amplification-and-isolation component 516 receives the output voltage 948 on the secondary side of the system 900, and outputs a feedback signal 950 to the terminal 940 (e.g., terminal FB). For example, the feedback signal 950 is received by at least the diode 934. In another example, the resistors 936 and 938 output a signal 952 to a non-inverting input terminal of the PWM comparator 932.

According to another embodiment, a primary current 954 that flows through the primary winding 504 is sensed by the current sensing resistor 518. For example, the current sensing resistor 518 in response outputs the sensed signal 956 to the terminal 946 (e.g., terminal CS). In another example, a current-jittering signal 970 (e.g., $I_{CS\_jitter}$) is received by the circuit component 939, and applied on at least the resistor 937 (e.g., $R_3$). In yet another example, in response, a signal 972 is output to an inverting input terminal of the PWM comparator 932. In yet another example, the PWM comparator 932 generates a comparison signal 958 based on the signal 952 and the signal 972. In yet another example, the circuit component 939 is removed, and the current-jittering signal 970 (e.g., $I_{CS\_jitter}$) is received directly by the resistor 937.

According to yet another embodiment, the resistors 522 and 524 receive an auxiliary current 960 that flows through the auxiliary winding 520, and in response outputs a demagnetization signal 962 to the terminal 942 (e.g., terminal dem). For example, the demagnetization detection component 926 receives the demagnetization signal 962, and outputs a detection signal 964. In another example, the flip-flop 928 receives the comparison signal 958 at one input terminal, and the detection signal 964 at another input terminal. In yet another example, the flip-flop 928 outputs a signal 966 to the gate driver 930. In yet another example, the gate driver 930 outputs a gate drive signal 968 through the terminal 944 (e.g., terminal gate) to drive the power switch 508.

According to yet another embodiment, with a certain output load, the disturbance to the peak values of the current 954 can be determined based on the following equation.

$$\Delta I_{pk} = \frac{I_{CS\_jitter} \times R_3}{R_{sense}} \quad \text{(Equation 6)}$$

where $\Delta I_{pk}$ represents the disturbance to the peak values of the current 954, $I_{CS\_jitter}$ represents the current-jittering signal 970, and $R_{sense}$ represents the resistance of the resistor 518. For example, the peak values of the current 954 are disturbed by the current-jittering signal 970. Hence, the switching frequency of the system 900 jitters according to certain embodiments. In another example, the current-jittering signal 970 changes over time. In yet another example, the amplitude of the current-jittering signal 970 changes continuously over time. In yet another example, the amplitude of the current-jittering signal 970 is randomly determined (e.g., pseudo-randomly determined).

Figure 10:
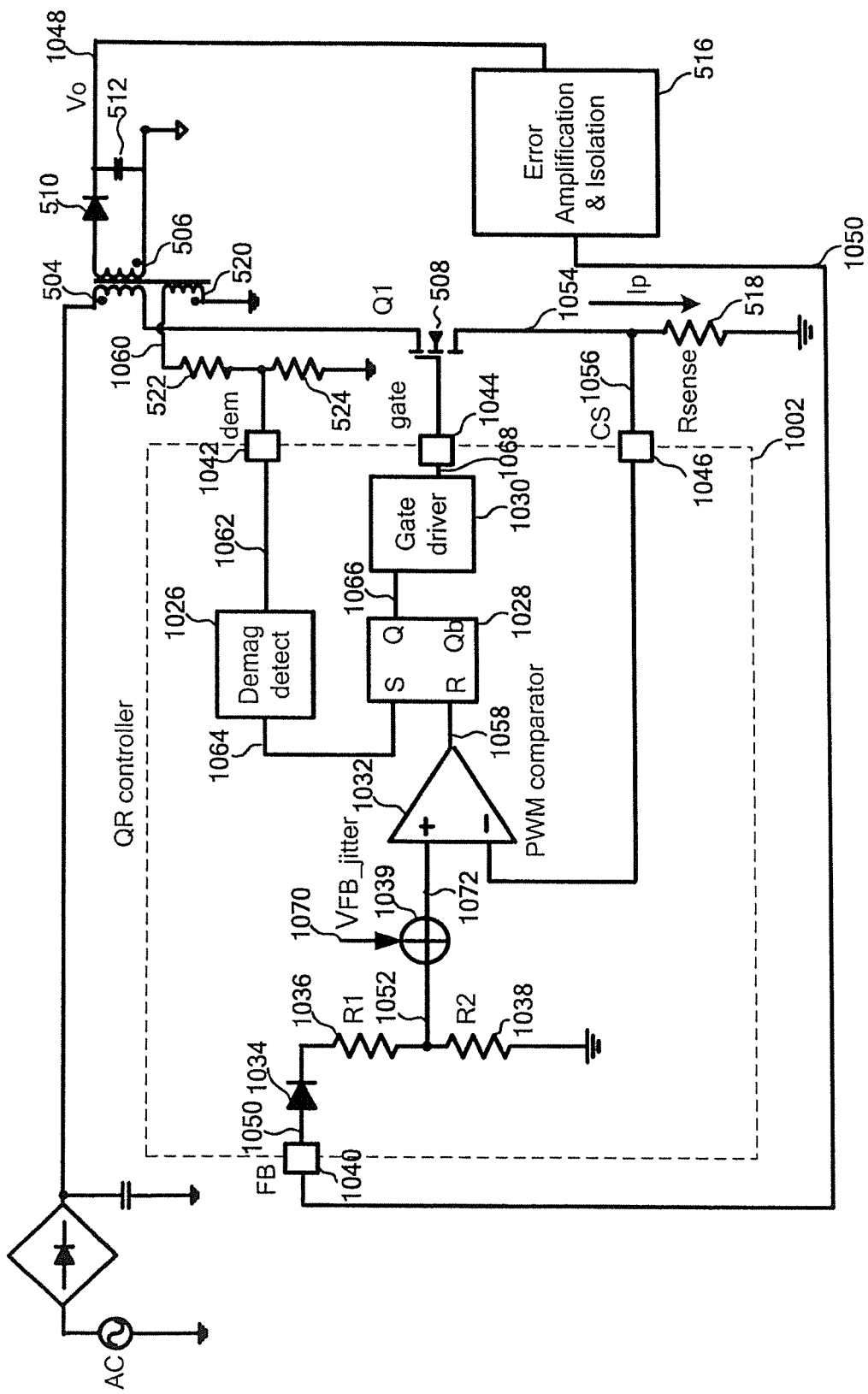
FIG. 10 is a simplified diagram showing a power conversion system including a QR controller according to yet another embodiment of the present invention.

FIG. 10 is a simplified diagram showing a power conversion system including a QR controller according to yet another embodiment of the present invention. This diagram is merely an example, which should not unduly limit the scope of the claims. One of ordinary skill in the art would recognize many variations, alternatives, and modifications. For example, FIG. 10 is implemented according to FIG. 6 or FIG. 7.

The power conversion system 1000 includes a QR controller 1002, the primary winding 504, the secondary winding 506, the power switch 508, the rectifying diode 510, the capacitor 512, the error-amplification-and-isolation component 516, the current sensing resistor 518, the auxiliary winding 520, and the resistors 522 and 524. The QR controller 1002 includes a demagnetization detection component 1026, a flip-flop 1028, a gate driver 1030, a PWM comparator 1032, a diode 1034, two resistors 1036 and 1038, and a combining component 1039. The QR controller 1002 further includes four terminals 1040, 1042, 1044 and 1046. For example, the combining component 1039 is an adder, a subtractor, or a multiplexer.

According to one embodiment, the demagnetization detection component 1026, the flip-flop 1028, the gate driver 1030, the PWM comparator 1032, the diode 1034, and the resistors 1036 and 1038 are the same as the demagnetization detection component 526, the flip-flop 528, the gate driver 530, the PWM comparator 532, the diode 534, and the resistors 536 and 538. For example, the terminals 1040, 1042, 1044 and 1046 are the same as the terminals 540, 542, 544 and 546.

According to one embodiment, the error-amplification-and-isolation component 516 receives the output voltage 1048 on the secondary side of the system 1000, and outputs a feedback signal 1050 to the terminal 1040 (e.g., terminal FB). For example, the feedback signal 1050 is received by at least the diode 1034. In another example, the resistors 1036 and 1038 generate a signal 1052. In yet another example, the combining component 1039 receives the signal 1052 and a voltage-jittering signal 1070 (e.g., $V_{FB\_jitter}$), and outputs in response a combined signal 1072 to a non-inverting input terminal of the PWM comparator 1032.

According to another embodiment, a primary current 1054 that flows through the primary winding 504 is sensed by the current sensing resistor 518. For example, the current sensing resistor 518 in response outputs the sensed signal 1056 to the terminal 1046 (e.g., terminal CS). In another example, the sensed signal 1056 is received at an inverting input terminal of the PWM comparator 1032. In yet another example, the PWM comparator 1032 generates a comparison signal 1058 based on the signal 1052 and the combined signal 1072.

According to yet another embodiment, the resistors 522 and 524 receive an auxiliary current 1060 that flows through the auxiliary winding 520, and in response outputs a demagnetization signal 1062 to the terminal 1042 (e.g., terminal dem). For example, the demagnetization detection component 1026 receives the demagnetization signal 1062, and outputs a detection signal 1064. In another example, the flip-flop 1028 receives the comparison signal 1058 at one input terminal, and the detection signal 1064 at another input terminal. In yet another example, the flip-flop 1028 outputs a signal 1066 to the gate driver 1030. In yet another example, the gate driver 1030 outputs a gate drive signal 1068 through the terminal 1044 (e.g., terminal gate) to drive the power switch 508.

According to yet another embodiment, with a certain output load, the disturbance to the peak values of the current 1054 can be determined based on the following equation.

$$\Delta I_{pk} = \frac{V_{FB\_jitter}}{R_{sense}} \qquad \text{(Equation 7)}$$

where $\Delta I_{pk}$ represents the disturbance to the peak values of the current 1054, $V_{FB\_jitter}$ represents the voltage-jittering signal 1070, and $R_{sense}$ represents the resistance of the resistor 518. For example, the peak values of the current 1054 are disturbed by the voltage-jittering signal 1070. Hence, the switching frequency of the system 1000 jitters according to certain embodiments. In yet another example, the frequency of the voltage-jittering signal 1070 is higher than the bandwidth of the error-amplification-and-isolation component 516, and the feedback signal 1050 remains approximately constant in magnitude during a jittering period. In another example, the voltage-jittering signal 1070 changes over time. In yet another example, the amplitude of the voltage-jittering signal 1070 changes continuously over time. In yet another example, the amplitude of the voltage-jittering signal 1070 is randomly determined (e.g., pseudo-randomly determined).

Figure 11:
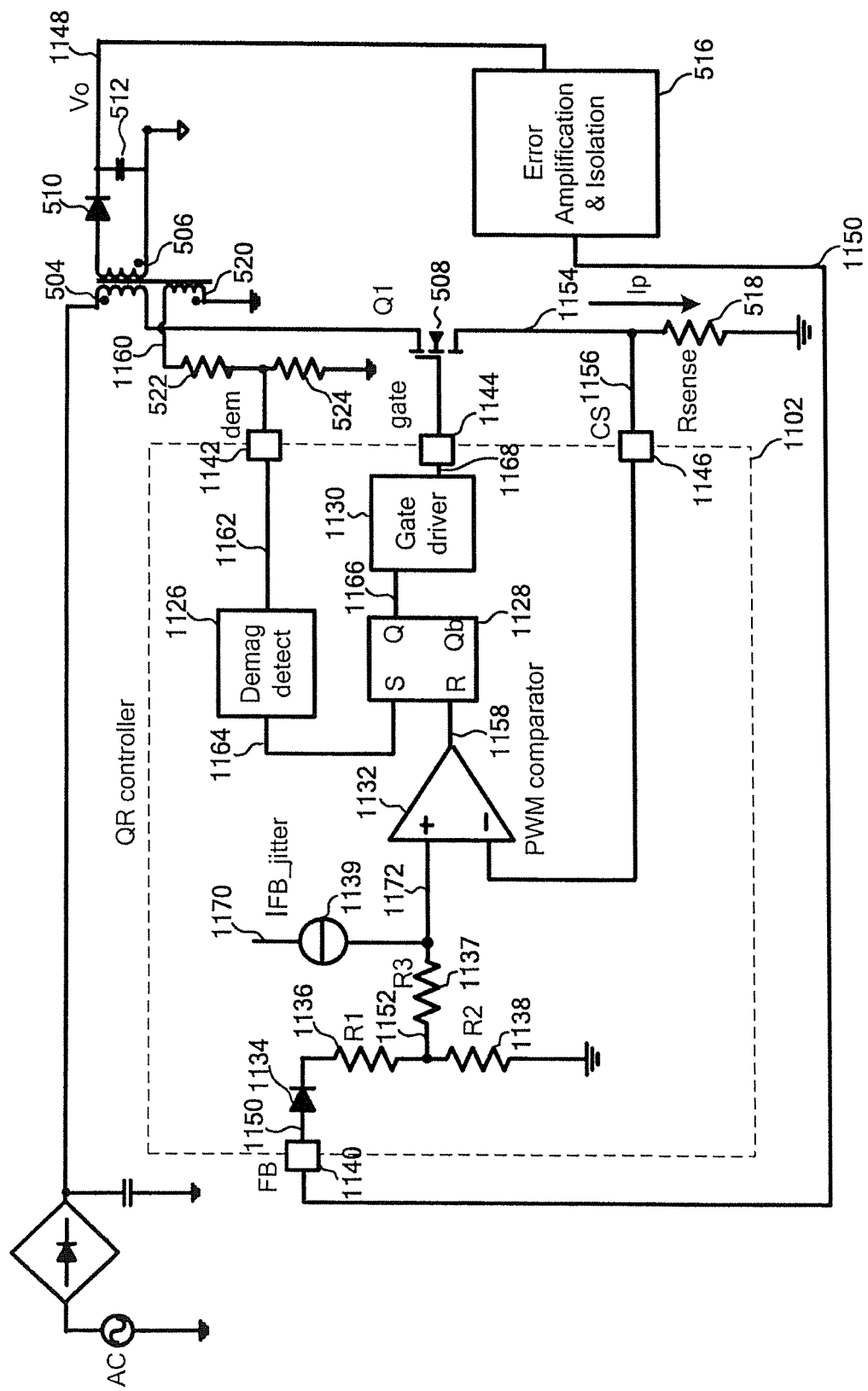
FIG. 11 is a simplified diagram showing a power conversion system including a QR controller according to yet another embodiment of the present invention.

FIG. 11 is a simplified diagram showing a power conversion system including a QR controller according to yet another embodiment of the present invention. This diagram is merely an example, which should not unduly limit the scope of the claims. One of ordinary skill in the art would recognize many variations, alternatives, and modifications. For example, FIG. 11 is implemented according to FIG. 6 or FIG. 7.

The power conversion system 1100 includes a QR controller 1102, the primary winding 504, the secondary winding 506, the power switch 508, the rectifying diode 510, the capacitor 512, the error-amplification-and-isolation component 516, the current sensing resistor 518, the auxiliary winding 520, and the resistors 522 and 524. The QR controller 1102 includes a demagnetization detection component 1126, a flip-flop 1128, a gate driver 1130, a PWM comparator 1132, a diode 1134, three resistors 1136, 1137 and 1138, and a circuit component 1139. The QR controller 1102 further includes four terminals 1140, 1142, 1144 and 1146. For example, the circuit component 1139 is a current source.

According to one embodiment, the demagnetization detection component 1126, the flip-flop 1128, the gate driver 1130, the PWM comparator 1132, the diode 1134, and the resistors 1136 and 1138 are the same as the demagnetization detection component 526, the flip-flop 528, the gate driver 530, the PWM comparator 532, the diode 534, and the resistors 536 and 538. For example, the terminals 1140, 1142, 1144 and 1146 are the same as the terminals 540, 542, 544 and 546.

According to one embodiment, the error-amplification-and-isolation component 516 receives the output voltage 1148 on the secondary side of the system 1100, and outputs a feedback signal 1150 to the terminal 1140 (e.g., terminal FB). For example, the feedback signal 1150 is received by at least the diode 1134. In another example, the resistors 1136 and 1138 generate a signal 1152 that is received by the resistor 1137. In another example, a current-jittering signal 1170 (e.g., $I_{FB\_jitter}$) is received at the circuit component 1139, and applied on at least the resistor 1137 (e.g., $R_3$). In yet another example, in response, a signal 1172 is output to a non-inverting input terminal of the PWM comparator 1132. In yet another example, the circuit component 1139 is removed, and the current-jittering signal 1170 (e.g., $I_{FB\_jitter}$) is received directly by the resistor 1137.

According to another embodiment, a primary current 1154 that flows through the primary winding 504 is sensed by the current sensing resistor 518. For example, the current sensing resistor 518 in response outputs the sensed signal 1156 to the terminal 1146 (e.g., terminal CS). In yet another example, the PWM comparator 1132 receives the sensed signal 1156 at a negative input terminal. In yet another example, the PWM comparator 1132 generates a comparison signal 1158 based on the signal 1172 and the sensed signal 1156.

According to yet another embodiment, the resistors 522 and 524 receive an auxiliary current 1160 that flows through the auxiliary winding 520, and in response outputs a demagnetization signal 1162 to the terminal 1142 (e.g., terminal dem). For example, the demagnetization detection component 1126 receives the demagnetization signal 1162, and outputs a detection signal 1164. In another example, the flip-flop 1128 receives the comparison signal 1158 at one input terminal, and the detection signal 1164 at another input terminal. In yet another example, the flip-flop 1128 outputs a signal 1166 to the gate driver 1130. In yet another example, the gate driver 1130 outputs a gate drive signal 1168 through the terminal 1144 (e.g., terminal gate) to drive the power switch 508.

According to yet another embodiment, with a certain output load, the disturbance to the peak values of the current 1154 can be determined based on the following equation.

$$\Delta I_{pk} = \frac{I_{FB\_jitter} \times (R_3 + R_1 \| R_2)}{R_{sense}} \qquad \text{(Equation 8)}$$

where $\Delta I_{pk}$ represents the disturbance to the peak values of the current 1154, $I_{FB\_jitter}$ represents the current-jittering signal 1170, and $R_{sense}$ represents the resistance of the resistor 518. Additionally, $R_1$ represents the resistance of the resistor 1136, $R_2$ represents the resistance of the resistor 1138, and $R_3$ represents the resistance of the resistor 1137.

For example, the peak values of the current 1154 are disturbed by the current-jittering signal 1170. Hence, the switching frequency of the system 1100 jitters according to certain embodiments. In another example, the current-jittering signal 1170 changes over time. In yet another example, the amplitude of the current-jittering signal 1170 changes continuously over time. In yet another example, the amplitude of the current-jittering signal 1170 is randomly determined (e.g., pseudo-randomly determined).

Figure 12:
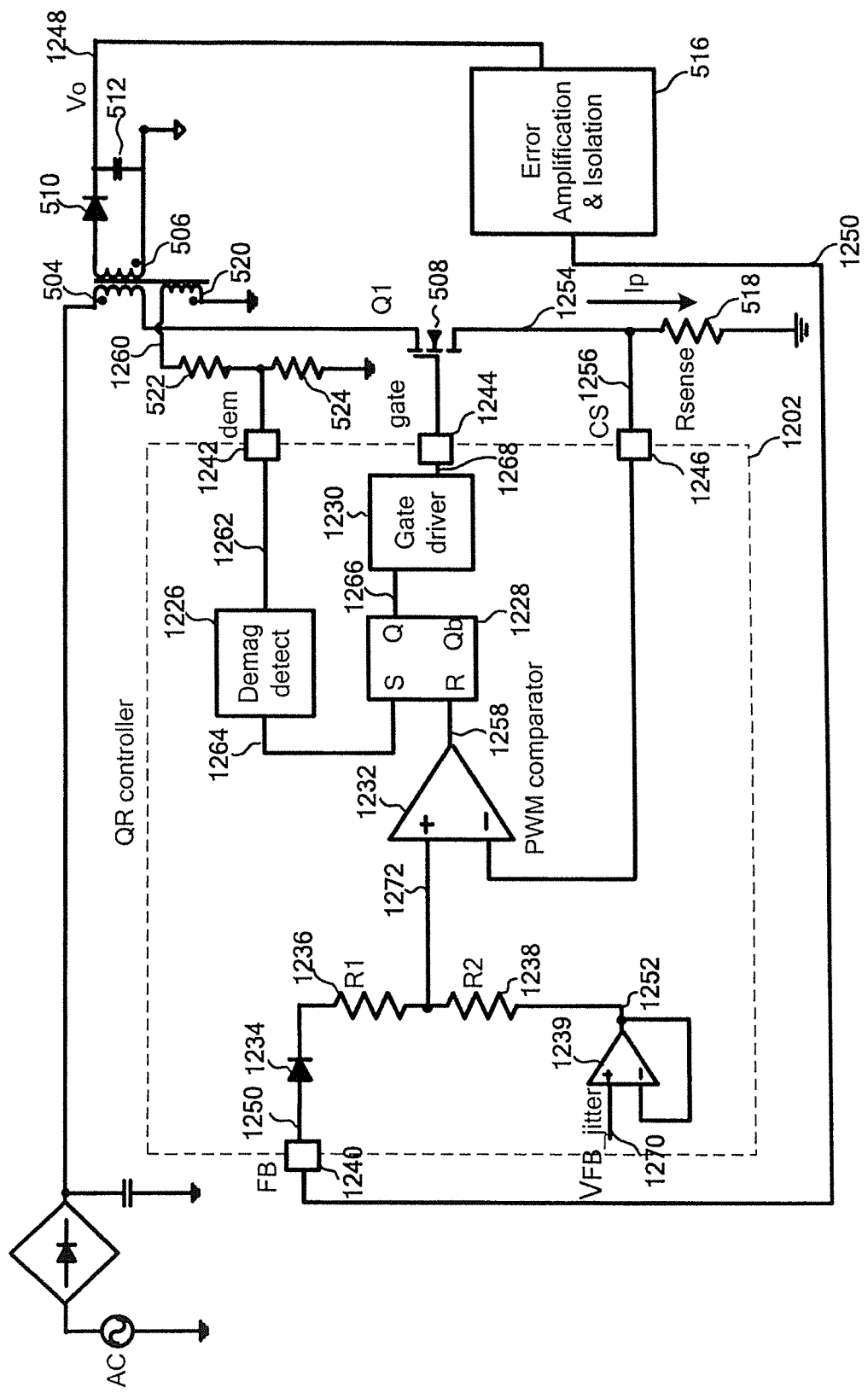
FIG. 12 is a simplified diagram showing a power conversion system including a QR controller according to yet another embodiment of the present invention.

FIG. 12 is a simplified diagram showing a power conversion system including a QR controller according to yet another embodiment of the present invention. This diagram is merely an example, which should not unduly limit the scope of the claims. One of ordinary skill in the art would recognize many variations, alternatives, and modifications. For example, FIG. 12 is implemented according to FIG. 6 or FIG. 7.

The power conversion system 1200 includes a QR controller 1202, the primary winding 504, the secondary winding 506, the power switch 508, the rectifying diode 510, the capacitor 512, the error-amplification-and-isolation component 516, the current sensing resistor 518, the auxiliary winding 520, and the resistors 522 and 524. The QR controller 1202 includes a demagnetization detection component 1226, a flip-flop 1228, a gate driver 1230, a PWM comparator 1232, a diode 1234, two resistors 1236 and 1238, and an amplifier 1239. The QR controller 1202 further includes four terminals 1240, 1242, 1244 and 1246.

According to one embodiment, the demagnetization detection component 1226, the flip-flop 1228, the gate driver 1230, the PWM comparator 1232, the diode 1234, and the resistors 1236 and 1238 are the same as the demagnetization detection component 526, the flip-flop 528, the gate driver 530, the PWM comparator 532, the diode 534, and the resistors 536 and 538. For example, the terminals 1240, 1242, 1244 and 1246 are the same as the terminals 540, 542, 544 and 546. In another example, the amplifier 1239 has a negative input terminal coupled to an output terminal.

According to one embodiment, the error-amplification-and-isolation component 516 receives the output voltage 1248 on the secondary side of the system 1200, and outputs a feedback signal 1250 to the terminal 1240 (e.g., terminal FB). For example, the feedback signal 1250 is received by at least the diode 1234. In another example, the amplifier 1239 receives a voltage-jittering signal 1270 (e.g., $V_{FB\_jitter}$) at a positive input terminal, and outputs a signal 1252. In yet another example, the resistors 1236 and 1238 output a signal 1272 to a non-inverting input terminal of the PWM comparator 1232.

According to another embodiment, a primary current 1254 that flows through the primary winding 504 is sensed by the current sensing resistor 518. For example, the current sensing resistor 518 in response outputs the sensed signal 1256 to the terminal 1246 (e.g., terminal CS). In another example, the sensed signal 1256 is received at an inverting input terminal of the PWM comparator 1232. In yet another example, the PWM comparator 1232 generates a comparison signal 1258 based on the sensed signal 1256 and the signal 1272.

According to yet another embodiment, the resistors 522 and 524 receive an auxiliary current 1260 that flows through the auxiliary winding 520, and in response outputs a demagnetization signal 1262 to the terminal 1242 (e.g., terminal dem). For example, the demagnetization detection component 1226 receives the demagnetization signal 1262, and outputs a detection signal 1264. In another example, the flip-flop 1228 receives the comparison signal 1258 at one input terminal and the detection signal 1264 at another input terminal. In yet another example, the flip-flop 1228 outputs a signal 1266 to the gate driver 1230. In yet another example, the gate driver 1230 outputs a gate drive signal 1268 through the terminal 1244 (e.g., terminal gate) to drive the power switch 508.

According to yet another embodiment, with a certain output load, the disturbance to the peak values of the current 1254 can be determined based on the following equation.

$$\Delta I_{pk} = \frac{V_{FB\_jitter}}{R_{sense}} \times \frac{R_1}{R_1 + R_2} \quad \text{(Equation 9)}$$

where $\Delta I_{pk}$ represents the disturbance to the peak values of the current 1254, $V_{FB\_jitter}$ represents the voltage-jittering signal 1270, and $R_{sense}$ represents the resistance of the resistor 518. Additionally, $R_1$ represents the resistance of the resistor 1236, and $R_2$ represents the resistance of the resistor 1238.

For example, the peak values of the current 1254 are disturbed by the voltage-jittering signal 1270. Hence, the switching frequency of the system 1200 jitters according to certain embodiments. In another example, the voltage-jittering signal 1270 changes over time. In yet another example, the amplitude of the voltage-jittering signal 1270 changes continuously over time. In yet another example, the amplitude of the voltage-jittering signal 1270 is randomly determined (e.g., pseudo-randomly determined).

FIG. 13(*a*) is a simplified diagram showing the amplitude of a jittering signal as a function of a feedback signal as shown in FIGS. 10, 11, and 12 according to certain embodiments of the present invention. This diagram is merely an example, which should not unduly limit the scope of the claims. One of ordinary skill in the art would recognize many variations, alternatives, and modifications.

The waveform 1302 represents the amplitude of a jittering signal as a function of a feedback signal. For example, the jittering signal is the voltage-jittering signal 1070, the current jittering signal 1170, or the voltage-jittering signal 1270, and the feedback signal is the feedback signal 1050, the feedback signal 1150, or the feedback signal 1250, respectively. In another example, predetermined values $V_0$ and $V_1$ satisfy $0 \le V_0 \le V_1$. The voltage-jittering signal 1270 is used as an example in the following discussion. That is, as an example, the waveform 1302 represents the amplitude of the jittering signal 1270 as a function of the feedback signal 1250.

According to one embodiment, if the magnitude of the feedback signal 1250 (e.g., FB) is less than the predetermined value $V_0$, the amplitude of the jittering signal 1270 (e.g., Amplitude) is at a low value 1304 (e.g., approximately zero) as shown by the waveform 1302. For example, if the magnitude of the feedback signal 1250 is no less than the predetermined value $V_0$ and no larger than the predetermined value $V_1$, the amplitude of the jittering signal 1270 increases from the low value 1304 (e.g., at $V_0$) to a high value 1306 (e.g., at $V_1$), as shown by the waveform 1302. In another example, the amplitude of the jittering signal 1270 increases from the low value 1304 (e.g., at $V_0$) to the high value 1306 (e.g., at $V_1$) corresponding to a linear or non-linear function of the feedback signal 1250. In another example, if the magnitude of the feedback signal 1250 is larger than the predetermined value $V_1$, the amplitude of the jittering signal 1270 remains approximately at the high value 1306 as shown by the waveform 1302.

According to another embodiment, the magnitude of the feedback signal 1250 represents the output load of the system 1200. For example, the amplitude of the jittering signal 1270 reduces with the output load if the magnitude of the feedback signal 1250 is no less than the predetermined value $V_0$ and no larger than the predetermined value $V_1$. In another example, the disturbance to the peak values of the current 1254 reduces with the output load. In yet another example, the amplitude of the switching frequency jittering of the system 1200 remains approximately constant with different output loads.

As discussed above and further emphasized here, FIG. 13(a) is merely an example, which should not unduly limit the scope of the claims. One of ordinary skill in the art would recognize many variations, alternatives, and modifications. For example, the horizontal axis represents a current sensing signal, so that FIG. 13(a) is a simplified diagram showing the amplitude of a jittering signal as a function of a current sensing signal as shown in FIGS. 8 and 9 according to some embodiments of the present invention.

Figure 13A:
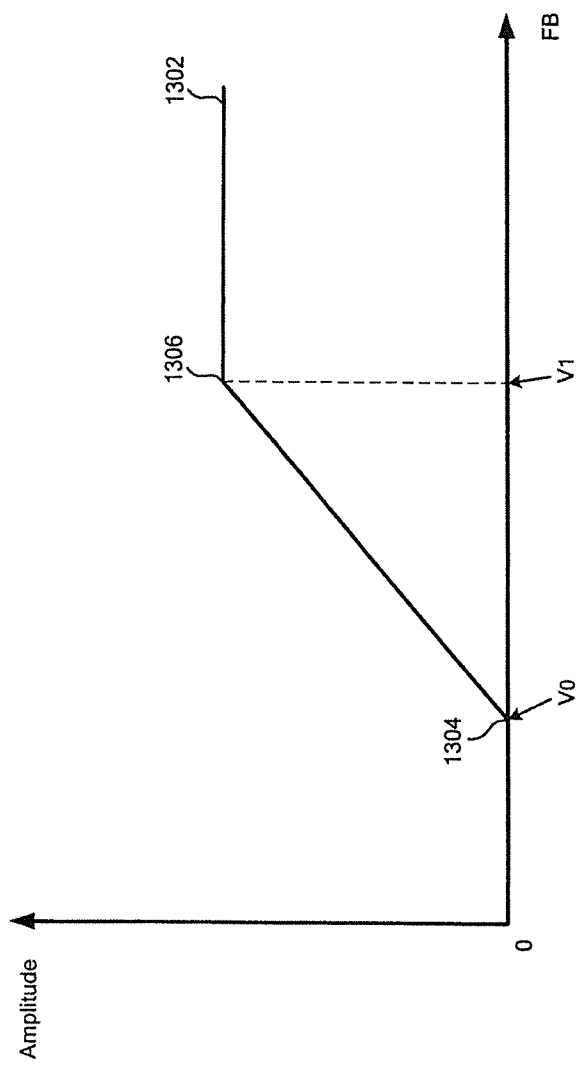
FIG. 13(a) is a simplified diagram showing the amplitude of a jittering signal as a function of a feedback signal as shown in FIGS. 10, 11, and 12 according to certain embodiments of the present invention.
Figure 13B:
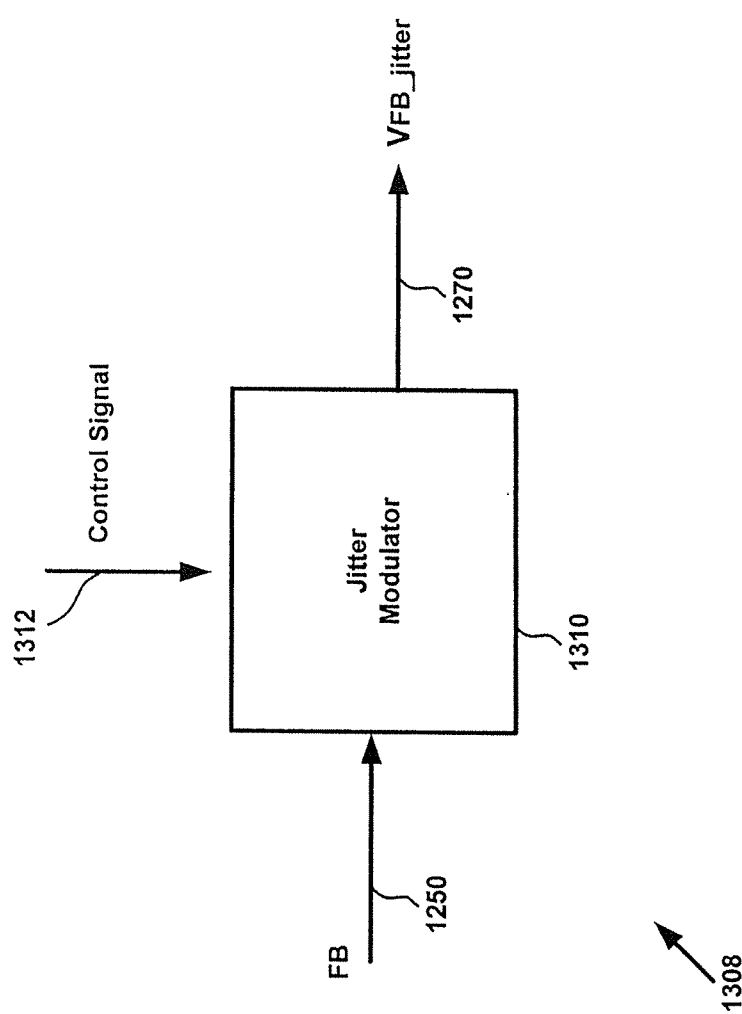
FIG. 13(b) is a simplified diagram showing a system for generating the jittering signal as a function of the feedback signal as shown in FIG. 13(a) according to some embodiments of the present invention.

FIG. 13(b) is a simplified diagram showing a system for generating the jittering signal as a function of the feedback signal as shown in FIG. 13(a) according to some embodiments of the present invention. This diagram is merely an example, which should not unduly limit the scope of the claims. One of ordinary skill in the art would recognize many variations, alternatives, and modifications.

The system 1308 includes a jitter modulator 1310. For example, the jittering signal is the voltage-jittering signal 1070, the current-jittering signal 1170, or the voltage-jittering signal 1270, and the feedback signal is the feedback signal 1050, the feedback signal 1150, or the feedback signal 1250, respectively. The voltage-jittering signal 1270 is used as an example in the following discussion. That is, as an example, the system 1308 generates the jittering signal 1270 as a function of the feedback signal 1250.

According to one embodiment, the jitter modulator 1310 receives the feedback signal 1250 (e.g. FB) and a control signal 1312. For example, the jitter modulator 1310 outputs in response the jittering signal 1270 (e.g., $V_{FB\_jitter}$). In another example, the magnitude of the feedback signal 1250 represents the output load. In yet another example, the amplitude of the jittering signal 1270 reduces with the output load if the magnitude of the feedback signal 1250 is within a predetermined range as shown in by the waveform 1302. In yet another example, the system 1308 can be used to generate the jittering signal 1070 based on the feedback signal 1050. In yet another example, the system 1308 can be used to generate the jittering signal 1170 based on the feedback signal 1150.

Figure 13C:
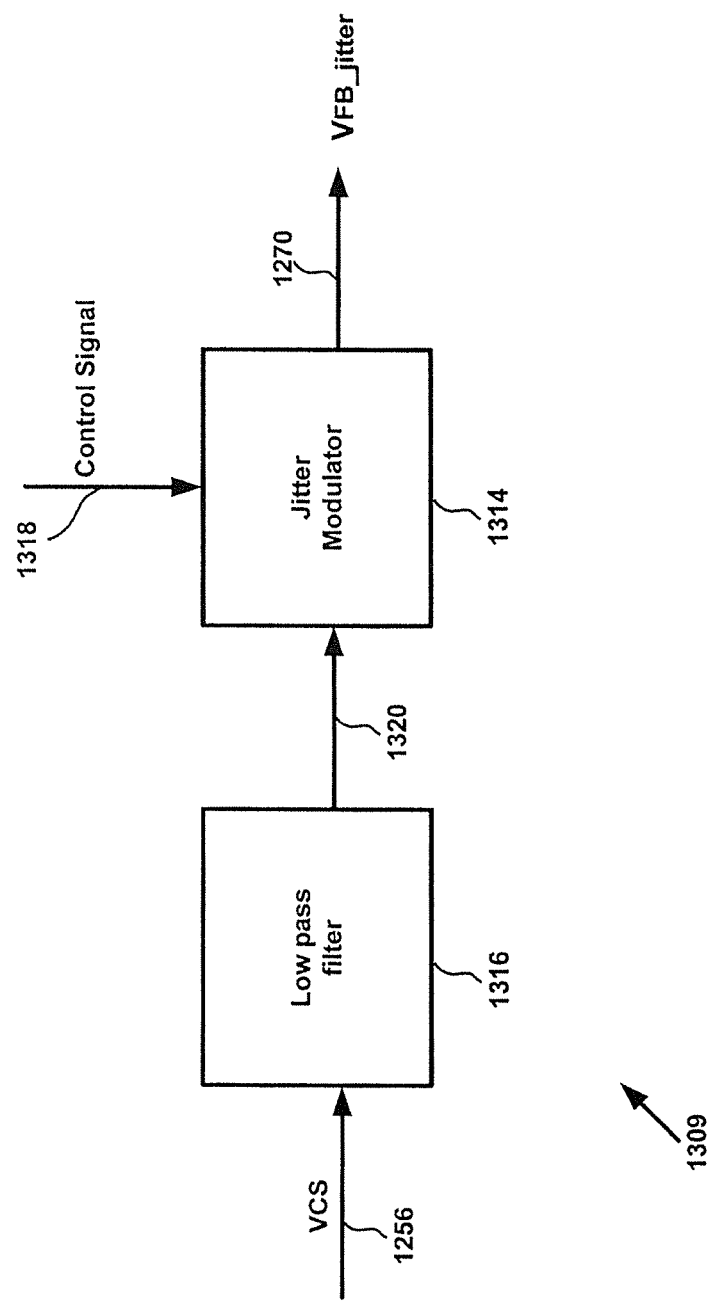
FIG. 13(c) is a simplified diagram showing a system for generating the jittering signal as a function of the feedback signal as shown in FIG. 13(a) according to certain embodiments of the present invention.

FIG. 13(c) is a simplified diagram showing a system for generating the jittering signal as a function of the feedback signal as shown in FIG. 13(a) according to certain embodiments of the present invention. This diagram is merely an example, which should not unduly limit the scope of the claims. One of ordinary skill in the art would recognize many variations, alternatives, and modifications.

The system 1309 includes a jitter modulator 1314 and a low-pass filter 1316. For example, the jittering signal is the voltage-jittering signal 1070, the current jittering signal 1170, or the voltage-jittering signal 1270, and the feedback signal is the feedback signal 1050, the feedback signal 1150, or the feedback signal 1250, respectively. The voltage-jittering signal 1270 is used as an example in the following discussion. That is, as an example, the system 1309 generates the jittering signal 1270 as a function of the feedback signal 1250.

According to one embodiment, the low-pass filter 1316 receives the sensed signal 1256 (e.g., $V_{CS}$), and generates in response a signal 1320. For example, the signal 1320 is proportional to the feedback signal 1250. In another example, the jitter modulator 1314 receives the signal 1320 and a control signal 1318, and outputs in response the jittering signal 1270 (e.g., $V_{FB\_jitter}$). In another example, the sensed signal 1256 (e.g., $V_{CS}$) is determined based on the following equation.

$$V_{CS} = I_{pk} \times R_{SENSE} \qquad \text{(Equation 10)}$$

where $V_{CS}$ represents the sensed signal 1256, $I_{pk}$ represents the peak values of the current 1254, and $R_{sense}$ represents the resistance of the resistor 518. In yet another example, the magnitude of the sensed signal 1256 represents the output load of the system 1200. In yet another example, the amplitude of the jittering signal 1270 changes with the output load.

As discussed above and further emphasized here, FIG. 13(c) is merely an example, which should not unduly limit the scope of the claims. One of ordinary skill in the art would recognize many variations, alternatives, and modifications. For example, FIG. 13(c) is a simplified diagram showing a system for generating the jittering signal as a function of the current sensing signal as shown in FIGS. 8 and 9 according to some embodiments of the present invention.

According to another embodiment, a system for regulating a power converter includes a signal processing component. The signal processing component is configured to receive a first input signal and a second input signal, process information associated with the first input signal and the second input signal, and output a drive signal to a switch based on at least information associated with the first input signal and the second input signal, the drive signal being associated with a switching frequency related to a power converter including the switch. The first input signal is associated with at least a feedback signal related to an output voltage of the power converter. The second input signal is associated with at least a primary current flowing through a primary winding of the power converter. Furthermore, the signal processing component is further configured to change a peak value of the primary current within a first predetermined range, and change the switching frequency of the power converter within a second predetermined range. For example, the system is implemented according to FIG. 6, FIG. 7, FIG. 8, FIG. 9, FIG. 10, FIG. 11, and/or FIG. 12.

According to another embodiment, a system for regulating a power converter includes a comparator and a driving component. The comparator is configured to receive a first input signal and a second input signal and generate a comparison signal based on at least information associated with the first input signal and the second input signal, the first input signal being associated with at least a feedback signal related to an output voltage of a power converter, the second input signal including a third input signal and being associated with at least a primary current flowing through a primary winding of the power converter. The driving component is configured to receive the comparison signal and output a drive signal to a switch based on at least information associated with the comparison signal, the drive signal being associated with a switching frequency related to the power converter including the switch. The comparator and the driving component are configured to, in response to at least the third input signal, change a peak value of the primary current within a first predetermined range and change the switching frequency of the power converter within a second predetermined range. For example, the system is implemented according to at least FIG. 6, FIG. 7, FIG. 8, and/or FIG. 9.

According to yet another embodiment, a system for regulating a power converter includes a comparator and a driving component. The comparator is configured to receive a first input signal and a second input signal and generate a comparison signal based on at least information associated with the first input signal and the second input signal, the first input signal including a third input signal and being associated with at least a feedback signal related to an output voltage of a power converter, the second input signal being associated with at least a primary current flowing through a primary winding of the power converter. The driving component is configured to receive the comparison signal and output a drive signal to a switch based on at least information associated with the comparison signal, the drive signal being associated with a switching frequency related to the power converter including the switch. The comparator and the driving component are configured to, in response to at least the third input signal, change a peak value of the primary current within a first predetermined range and change the switching frequency of the power converter within a second predetermined range. For example, the system is implemented according to at least FIG. 6, FIG. 7, FIG. 10, FIG. 11, and/or FIG. 12.

According to yet another embodiment, a method for regulating a power converter includes receiving a first input signal and a second input signal, the first input signal being associated with at least a feedback signal related to an output voltage of a power converter, the second input signal being associated with at least a primary current flowing through a primary winding of the power converter, processing information associated with the first input signal and the second input signal, and outputting a drive signal to a switch based on at least information associated with the first input signal and the second input signal, the drive signal being associated with a switching frequency related to the power converter including the switch. The method further includes changing, within a first predetermined range, a peak value of the primary current, and changing, within a second predetermined range, the switching frequency of the power converter. For example, the method is implemented according to FIG. 6, FIG. 7, FIG. 8, FIG. 9, FIG. 10, FIG. 11, and/or FIG. 12.

In another embodiment, a method for regulating a power converter includes receiving a first input signal and a second input signal, the first input signal being associated with at least a feedback signal related to an output voltage of a power converter, the second input signal including a third input signal and being associated with at least a primary current flowing through a primary winding of the power converter, processing information associated with the first input signal and the second input signal, and generating a comparison signal based on at least information associated with the first input signal and the second input signal. The method further includes receiving the comparison signal, processing information associated with the comparison signal, and outputting a drive signal to a switch based on at least information associated with the comparison signal, the drive signal being associated with a switching frequency related to the power converter including the switch. Additionally, the method includes changing, in response to at least the third input signal, a peak value of the primary current within a first predetermined range, and changing, in response to at least the third input signal, the switching frequency of the power converter within a second predetermined range. For example, the method is implemented according to at least FIG. 6, FIG. 7, FIG. 8, and/or FIG. 9.

In yet another embodiment, a method for regulating a power converter includes receiving a first input signal and a second input signal, the first input signal including a third input signal and being associated with at least a feedback signal related to an output voltage of a power converter, the second input signal being associated with at least a primary current flowing through a primary winding of the power converter, processing information associated with the first input signal and the second input signal, and generating a comparison signal based on at least information associated with the first input signal and the second input signal. The method further includes receiving the comparison signal, processing information associated with the comparison signal, and outputting a drive signal to a switch based on at least information associated with the comparison signal, the drive signal being associated with a switching frequency related to the power converter including the switch. Additionally, the method includes changing, in response to at least the third input signal, a peak value of the primary current within a first predetermined range, and changing, in response to at least the third input signal, the switching frequency of the power converter within a second predetermined range. For example, the method is implemented according to at least FIG. 6, FIG. 7, FIG. 10, FIG. 11, and/or FIG. 12.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for a power converter, the system comprising:
a comparator configured to directly receive a first input signal and a second input signal and generate a comparison signal based at least in part on the first input signal and the second input signal, the first input signal being associated with at least a feedback signal related to an output voltage of a power converter, the second input signal being associated with at least a current flowing through a primary winding of the power converter;
a signal combiner configured to combine a third input signal and a fourth input signal to generate the second input signal, the second input signal being a combination of the third input signal and the fourth input signal, the third input signal and the fourth input signal being two separate signals, the third input signal being a voltage-jittering signal, the fourth input signal being proportional in magnitude to the current flowing through the primary winding of the power converter; and a driver configured to output a drive signal based on at least information associated with the comparison signal, the drive signal being associated with a switching frequency;

wherein:
the comparator and the driver are configured to, in response to at least the third input signal, change a peak value of the current flowing through the primary winding of the power converter within a first predetermined range and change the switching frequency within a second predetermined range; and the peak value of the current flowing through the primary winding of the power converter is inversely proportional to the switching frequency.

2. The system of claim 1 wherein the signal combiner is an adder.

3. A method for a power converter, the method comprising:

directly receiving a first input signal and a second input signal, the first input signal being associated with at least a feedback signal related to an output voltage of a power converter, the second input signal being associated with at least a current flowing through a primary winding of the power converter;

generating a comparison signal based at least in part on the first input signal and the second input signal;

receiving the comparison signal;

outputting a drive signal based at least in part on the comparison signal, the drive signal being associated with a switching frequency;

changing, in response to at least a third input signal, a peak value of the current flowing through the primary winding of the power converter within a first predetermined range; and changing, in response to at least the third input signal, the switching frequency within a second predetermined range;

wherein:
the second input signal is a combination of the third input signal and a fourth input signal, the third input signal and the fourth input signal being two separate signals, the third input signal being a voltage-jittering signal, the fourth input signal being proportional in magnitude to the current flowing through the primary winding of the power converter; and the peak value of the current flowing through the primary winding of the power converter is inversely proportional to the switching frequency.

4. The method of claim 3 wherein the second input signal is generated in response to an addition of the third input signal and the fourth input signal.

* * * * *